United States Patent [19]
Binder et al.

[11] Patent Number: 5,323,513
[45] Date of Patent: Jun. 28, 1994

[54] SAFETY APPARATUS FOR A TRAVELING UNIT OF A TEXTILE MACHINE AND METHOD OF OPERATING THE TEXTILE MACHINE

[75] Inventors: Rolf Binder, Raterschen; Daniel Hanselmann, Winterthur; Peter Anderegg, Winterthur; Walter Schlepfer, Winterthur; Martin Kyburz, Andelfingen; Robert Demuth, Nurensdorf; Thomas Gloor, Winterthur; Jost Aebli, Winterthur; Jürg Faas, Dinhard, all of Switzerland

[73] Assignee: Maschinenfabrik Rieter AG, Winterthur, Switzerland

[21] Appl. No.: 861,996

[22] Filed: Apr. 1, 1992

Related U.S. Application Data

[63] Continuation-in-part of Ser. No. 740,417, Aug. 5, 1991, abandoned, which is a continuation of Ser. No. 465,992, Jan. 16, 1990, abandoned.

[30] Foreign Application Priority Data

| | | | |
|---|---|---|---|
| Jan. 16, 1989 | [CH] | Switzerland | 120/89 |
| Aug. 11, 1989 | [CH] | Switzerland | 2956/89 |
| Nov. 13, 1989 | [CH] | Switzerland | 4164/89 |
| Sep. 19, 1991 | [CH] | Switzerland | 2778/91 |
| Dec. 19, 1991 | [CH] | Switzerland | 3789/91 |
| Jan. 20, 1992 | [CH] | Switzerland | 152/92 |

[51] Int. Cl.⁵ .......................................... D01G 31/00
[52] U.S. Cl. .................... 19/80 R; 19/65 A; 19/97.5; 241/30; 241/37.5; 241/605
[58] Field of Search ............. 241/36, 37.5, 101.7, 241/605, 30; 19/0.2, 0.21, 0.22, 0.23, 80 R, 81, 65 A, 97.5; 28/185, 186; 26/51.5; 364/470, 474.2, 184, 550, 424.02, 551.01; 340/556, 557, 367, 93, 540, 541

[56] References Cited

U.S. PATENT DOCUMENTS

| | | |
|---|---|---|
| 3,971,103 | 7/1976 | Ono et al. ............... 19/80 R X |
| 4,232,286 | 11/1980 | Voll . |
| 4,280,580 | 7/1981 | Wojcik . |
| 4,446,602 | 5/1984 | Marx et al. . |
| 4,595,149 | 6/1986 | Hergeth . |
| 4,661,797 | 4/1987 | Schmall . |
| 4,707,887 | 11/1987 | Leifeld et al. ........... 19/80 R X |
| 4,723,344 | 2/1988 | Leifeld ..................... 19/80 R |
| 4,757,450 | 7/1988 | Etoh . |
| 4,802,096 | 1/1989 | Hainsworth et al. . |

(List continued on next page.)

FOREIGN PATENT DOCUMENTS

| | | |
|---|---|---|
| 193647 | 9/1986 | European Pat. Off. ........... 19/80 R |
| 0379465 | 7/1990 | European Pat. Off. . |
| 0419833 | 4/1991 | European Pat. Off. . |

(List continued on next page.)

OTHER PUBLICATIONS

Description of ultrasonic transducer from Siemens AG., product literature, 1989, Order No. GWA 4 NEB 839 0476–10a.

Primary Examiner—Mark Rosenbaum
Assistant Examiner—Frances Chin
Attorney, Agent, or Firm—Sandler Greenblum & Bernstein

[57] ABSTRACT

A bale opening machine is provided with a safety apparatus, by means of which there are produced safety barriers or fences parallel to lengthwise sides of a row of bales to be opened and/or substantially perpendicular to the direction of movement of the bale opening machine. The safety apparatus moves in conjunction with the bale opening machine. The safety apparatus can comprise mechanical and/or sensory protective structure. The sensory protective structure comprises one or more electro-acoustical transducers arranged in a sonic chute together with one or more reference reflectors such that transmitted acoustical signals are split into a measuring signal and a reference signal. The reference signal is reflected at one of the reference reflectors, whereas the measuring signal is reflected at a deflection reflector into the monitored area and back again by an object located in the monitored area.

51 Claims, 17 Drawing Sheets

U.S. PATENT DOCUMENTS

| | | | |
|---|---|---|---|
| 4,813,615 | 3/1989 | Hôsel et al. | 241/605 |
| 4,813,616 | 3/1989 | Hosel et al. | |
| 4,887,070 | 12/1989 | Pinto et al. | |
| 5,105,507 | 4/1992 | Staheli | 19/80 R |
| 5,105,508 | 4/1992 | Aebli et al. | 19/80 R |
| 5,123,144 | 6/1992 | Demuth et al. | 19/65 A |

FOREIGN PATENT DOCUMENTS

| | | | |
|---|---|---|---|
| 428477 | 5/1991 | European Pat. Off. | 19/80 R |
| 3032584 | 3/1982 | Fed. Rep. of Germany | |
| 3034589 | 6/1982 | Fed. Rep. of Germany | 19/80 R |
| 3335792 | 4/1985 | Fed. Rep. of Germany | 19/80 R |
| 3335793 | 4/1985 | Fed. Rep. of Germany | 19/80 R |
| 3436498 | 4/1986 | Fed. Rep. of Germany | 19/80 R |
| 3733972 | 4/1989 | Fed. Rep. of Germany | |
| 3932665 | 4/1991 | Fed. Rep. of Germany | |
| 988914 | 1/1983 | U.S.S.R. | 19/80 R |
| 2086037 | 5/1982 | United Kingdom | 19/80 R |
| 2149436 | 6/1985 | United Kingdom | 19/80 R |

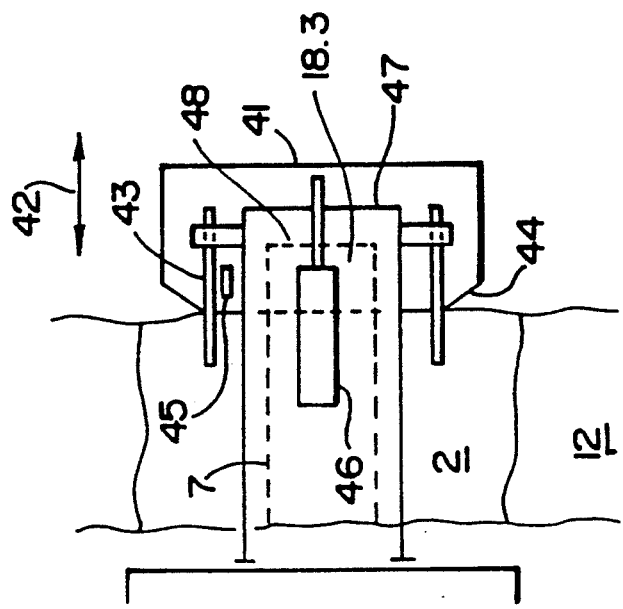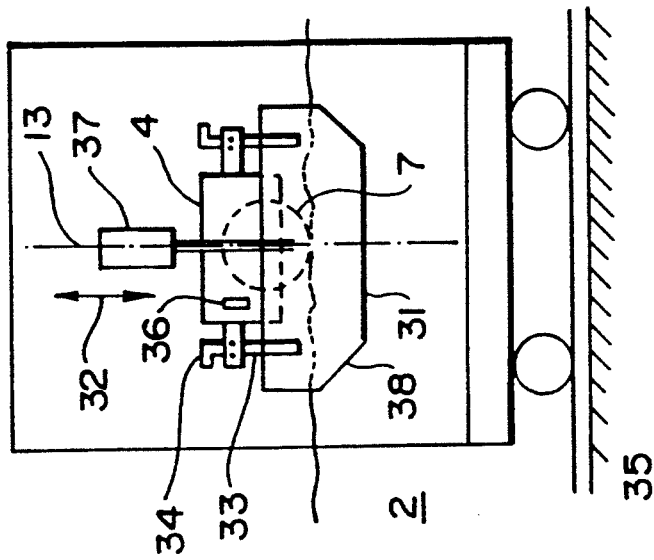

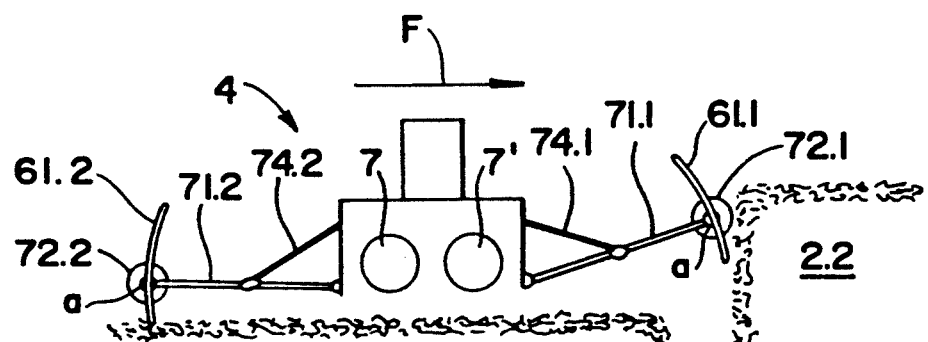
Fig-9
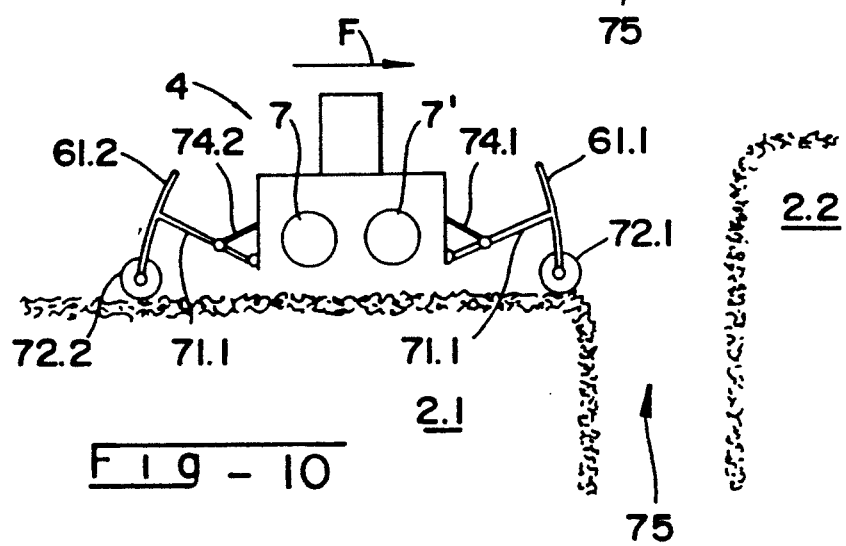
Fig-10
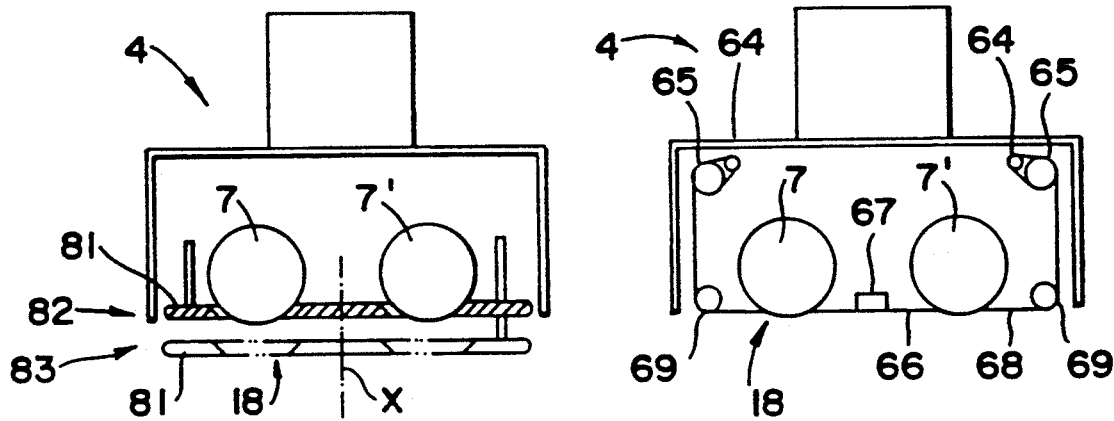
Fig-11
Fig-12

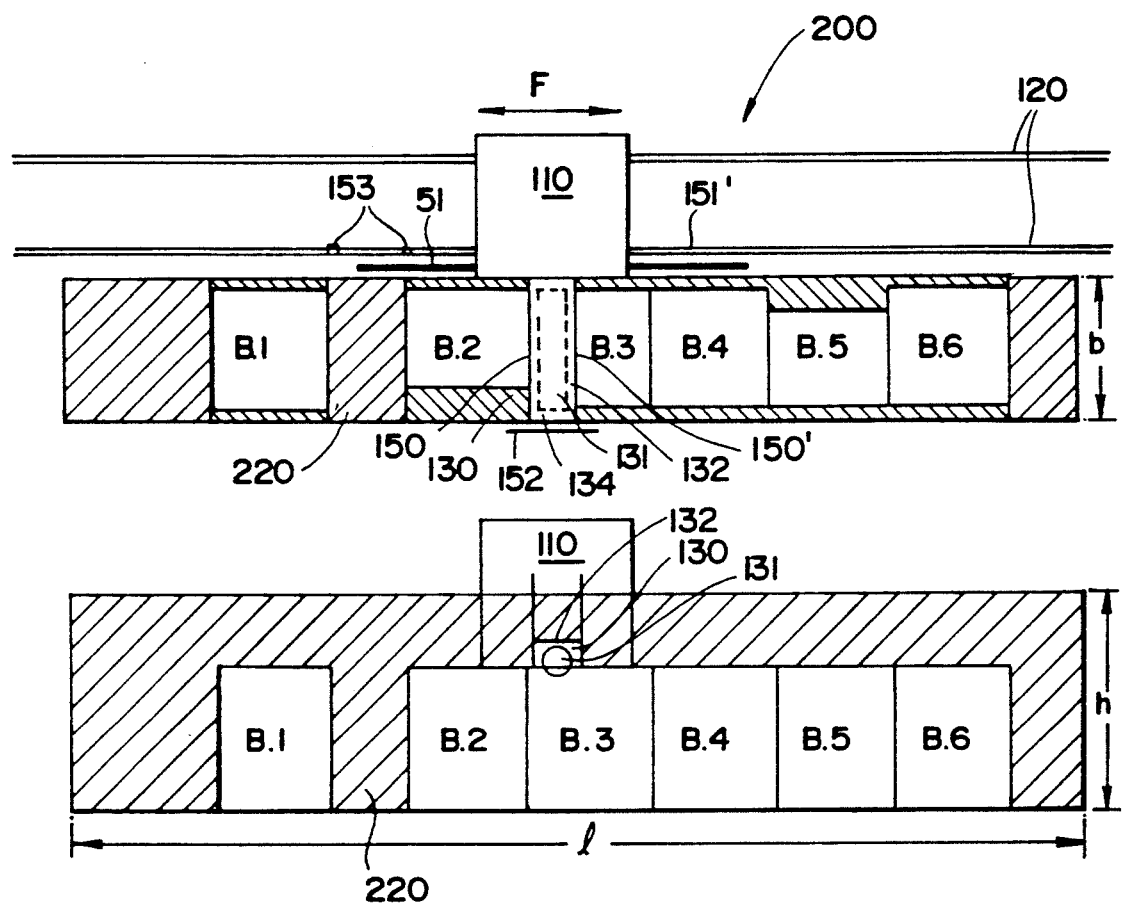

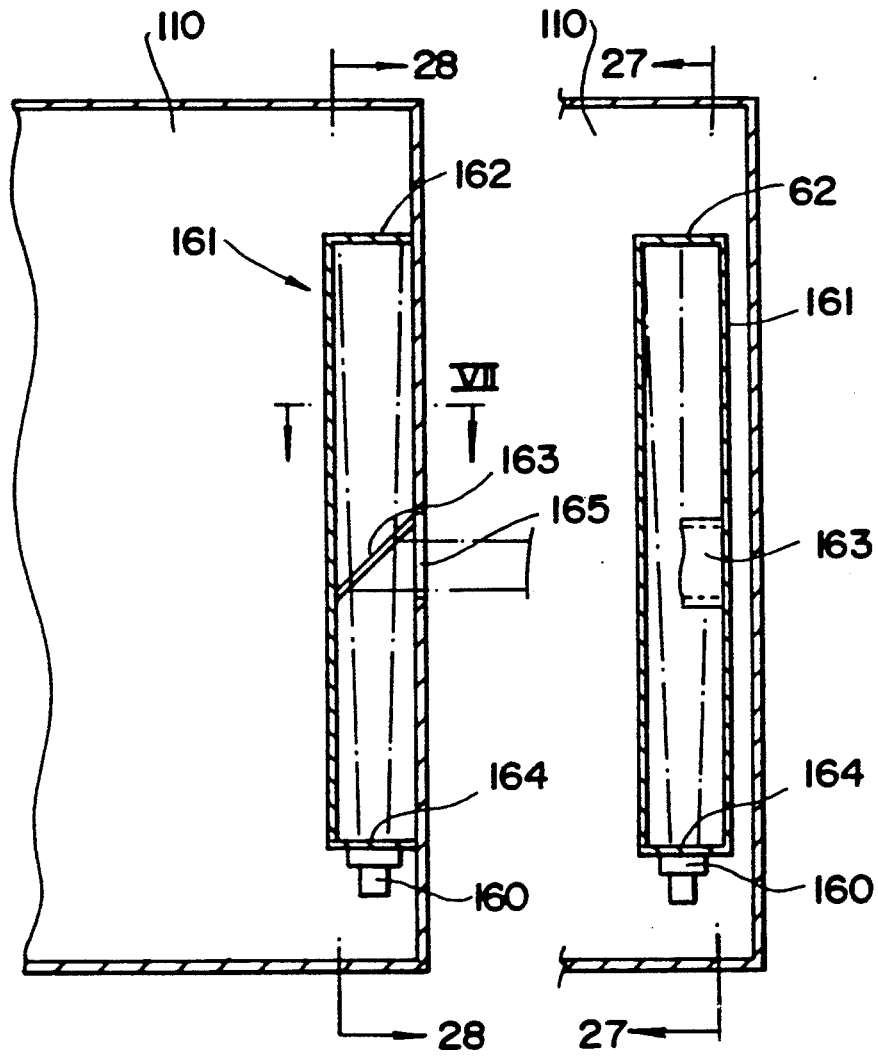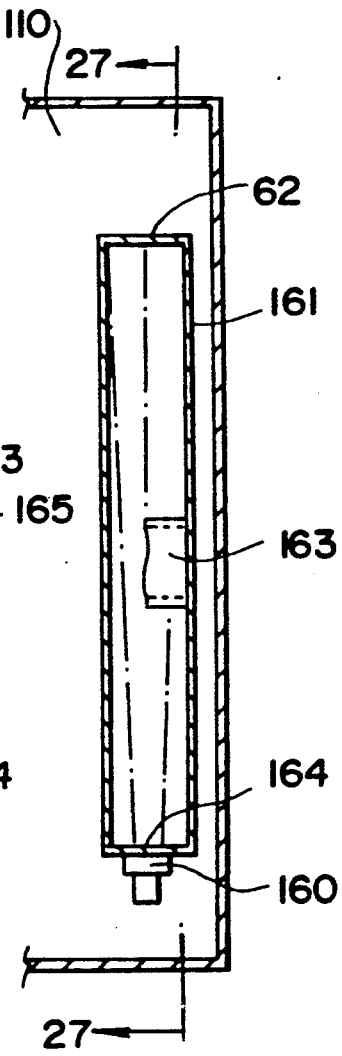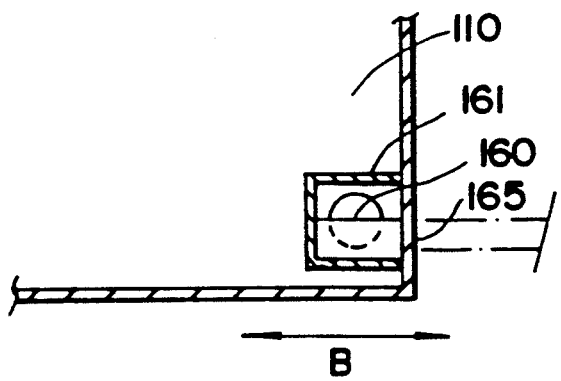

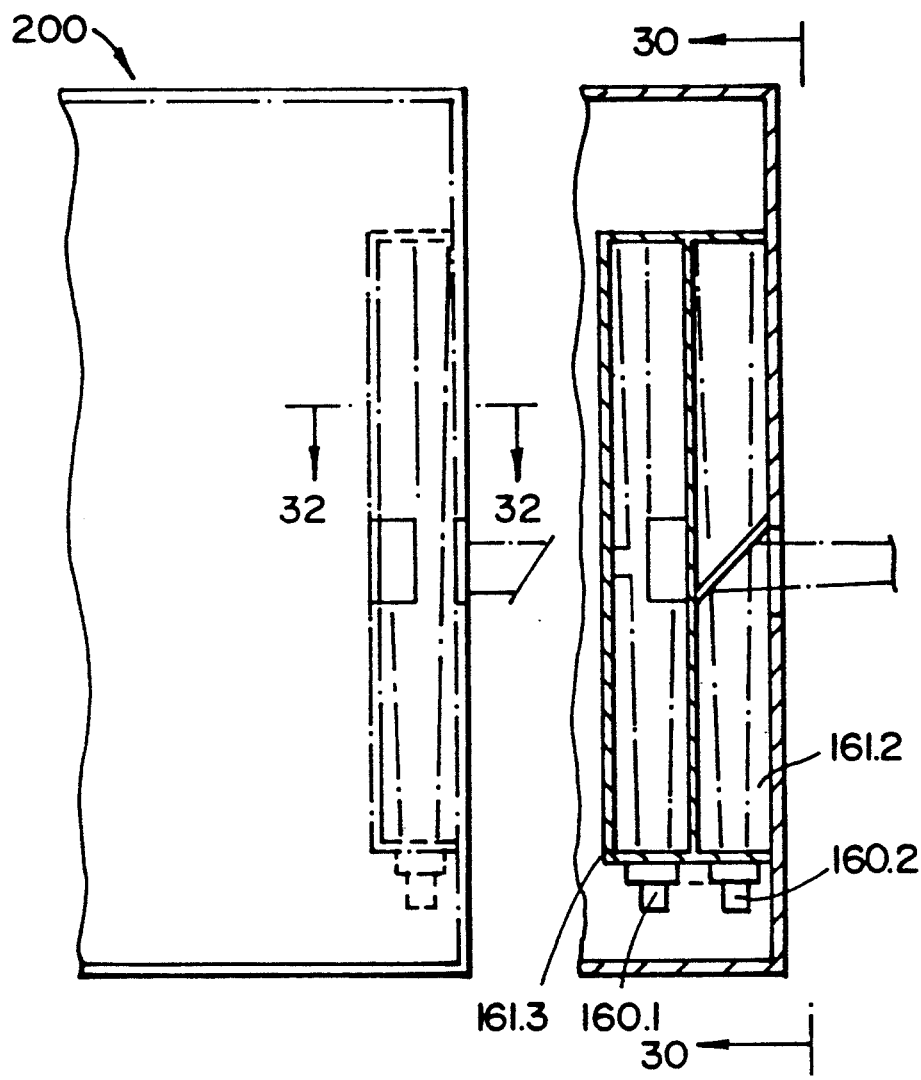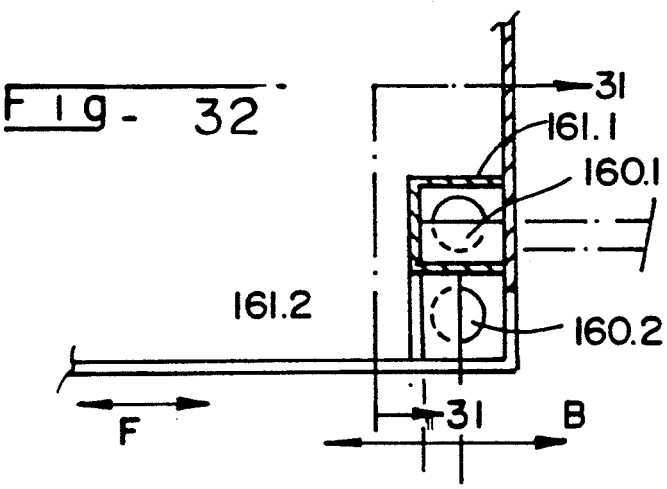

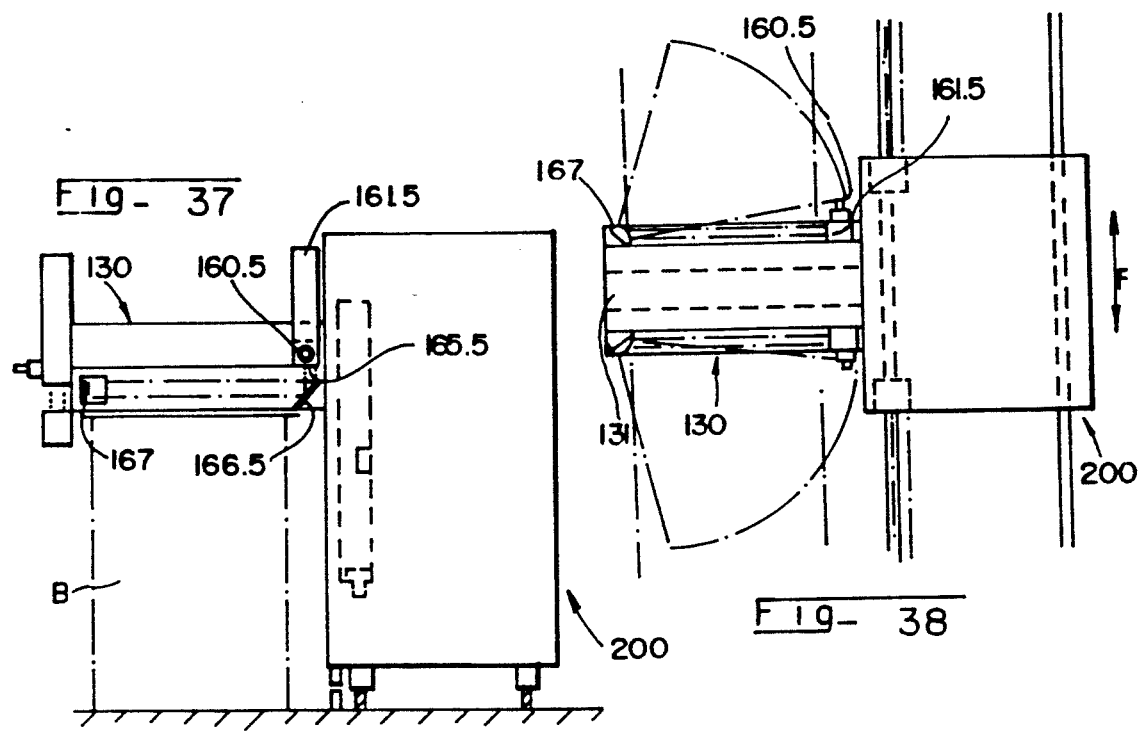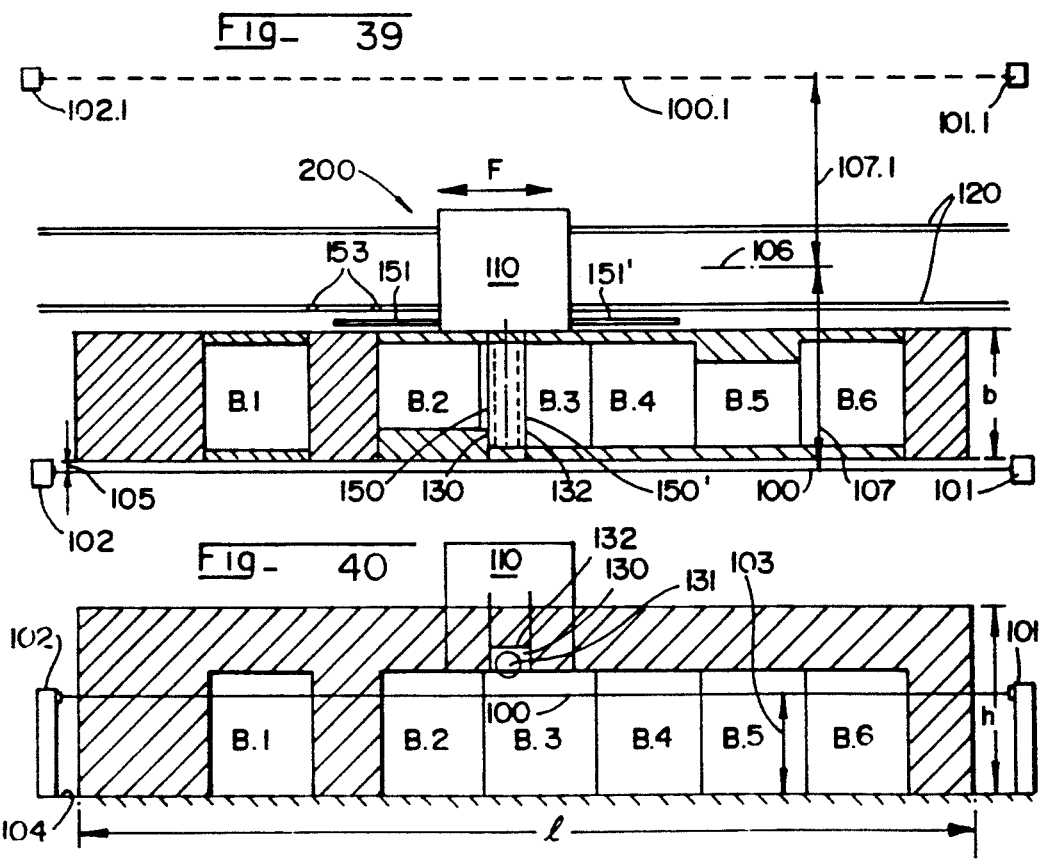

SAFETY APPARATUS FOR A TRAVELING UNIT OF A TEXTILE MACHINE AND METHOD OF OPERATING THE TEXTILE MACHINE

CROSS REFERENCE TO RELATED APPLICATIONS

This application is a continuation-in--part application of U.S. application Ser. No. 07/740,417, filed Aug. 5, 1991, entitled "Bale Opener With Safety Equipment" which, in turn, is a continuation application of U.S. application Ser. No. 07/465,992, filed Jan. 16, 1990, entitled "Bale Opener With Safety Equipment", both now abandoned. The disclosures of these applications are incorporated in their entirety herein by reference.

BACKGROUND OF THE INVENTION

1. Field of the Invention

The present invention is in the field of textile equipment, and, more particularly, concerns a safety apparatus for a traveling unit or device of a textile machine and a method of operating such textile machine.

In a particularly advantageous environment of use of the present invention, such relates to bale opener or opening apparatus provided with safety apparatus or equipment for minimizing risks that foreign objects, meaning not only inanimate objects but also human beings, such as especially the hands or other parts of machine operating personnel, will come into contact with rapidly rotating or moving components of the textile machine. Still further, the invention is especially, although not exclusively concerned, with safety or protective apparatuses or devices constructed and arranged to prevent entry of objects into the zone occupied by opening rollers of opening members of cotton bale openers or bale opening machines and to sensing systems for detecting in advance objects moving toward such zones, so that the opening rollers or the bale opening machines may be stopped before damage is done. The present invention is capable of specifically providing protection in zones laterally below, frontally below and directly below the opening member of a bale opener or bale opening machine.

2. Discussion of the Background and Material Information

Textile fiber raw material and, in particular, raw cotton is usually delivered in bale form. In a fiber processing operation prior to spinning, the raw cotton material must be brought into the form of loose flocks and in this state the material is subsequently cleaned and the individual fibers are stretched and rendered parallel to one another in a carding process.

Bale opening machines, which open such bales, typically contain a machine frame equipped with traveling wheels which is moved back and forth upon essentially straight rails along a limited bale opening path. At one side of the machine frame there is mounted the opening member in a direction extending transversely with respect to the essentially straight rails such that the opening member can be elevationally displaced. The bales to be opened are arranged in rows substantially parallel to the essentially straight rails and the opening member is moved back and forth over the top surface of the erected bale row in order to remove the fiber material in the form of fiber flocks.

The opening member possesses one or more drivable opening rollers arranged such that their rotational axes are disposed horizontal and substantially perpendicular to the direction of movement of the bale opening machine. These opening rollers are encased in a casing or housing which is open towards the top and laterally enclosed at all sides, however open towards the bottom. During opening of the bales this downwardly directed or lower opening of the casing or housing is essentially closed off by the top surface of the bales, so that the opening rollers present no danger to the machine operators or other objects. Nonetheless, danger zones or areas exist around the vicinity of the bale opening machine, especially when processing irregular bale rows. Under these circumstances, the opening rollers constitute a real danger during their rotation and when the lower opening of the housing is not completely shielded. A machine operator or other individual and also an inanimate object can enter from below or at an inclination from below through the lower opening and inadvertently contact the opening rollers, resulting in the occurrence of an accident.

More specifically, loosening of the bale-like raw material and the successive delivery thereof to the cleaning and carding means are generally performed through the layerwise opening up of the bales using the bale opening machine containing, as stated, one or more of such rapidly rotating opening rollers equipped, for instance, with tearing pins. As also previously explained, such bale opening machines or bale openers are, for example, provided with the opening member which is passed from above over the row of the raw textile bales. By moving the opening member backwards and forwards over the bale row with simultaneous lowering thereof, the raw fiber material is removed layer-by-layer by the opening roller or rollers, as the case may be. The thus obtained fiber flocks are supplied to a subsequent processing means as a flock stream by a ventilator or fan.

The exposed parts of the rapidly rotating opening roller or rollers can constitute a hazard for the machine operator, particularly if the operator does not exercise sufficient care when working on or around the bale opening machine. This danger occurs if the area of the bale opening machine which is open towards the bottom of the opening roller or roller is not completely and directly located over and in contact with the bale to be processed. For example, this is the case when the opening member has reached the end of the bale row, if a bale row with bales of unequal height are processed, or if the dimensions of the bales do not completely shield the opening roller or rollers.

As is known in this art, danger zones or areas either can be fenced off by mechanical barriers, so that access thereto is not possible and/or at locations where such access or entry is possible, there can be used monitoring or surveillance barriers which produce an alarm in the event of unwanted access or entry. Upon giving of such alarm the danger event is, for example, shutdown. Specifically, in the case of a bale opening machine the bale opening rollers are typically stopped, thereby eliminating any danger therefrom.

Furthermore, according to the prior art, the inherent danger of rotating bale opening rollers, in those cases where they are not screened off or shielded, is counteracted in basically two different ways: the first technique employs a stationary barrier or fence around the entire row of bales, in other words, there is fenced off the entire region or space through which the potentially dangerous bale opening roller or rollers travel, or else there can be employed a barrier or guard which essentially co-travels with the potentially dangerous bale opening roller or rollers and surrounds the immediate vicinity of such bale opening roller or rollers.

A stationary barrier or fence which encircles the entire region through which the bale opening member moves has been disclosed, for instance, in the German Patent No. 3,032,584, published Mar. 11, 1982. Here, a light barrier is provided around the row of bales. Upon interruption of the light barrier the opening rollers are stopped. A drawback of this or any similar arrangement resides in the large size of the fenced off area, and thus, the freedom of movement of the operating personnel is exceedingly limited. Although measures are taken for keeping the protected area as small as possible (switching between two monitoring areas), in general an excessively large monitoring area is covered, which can lead to unnecessary work interruptions. There is also a risk that the light beam monitoring the danger area can be stepped over by personnel, or passage under the same is possible. In addition, personnel located in the monitoring area prior to switching on of the means are not detected. The system is also based on a precise arrangement of the mirrors or reflectors and is consequently fault-prone (deformation/shifting of the reflectors). Also, there exists a relatively great probability of sounding a false alarm, since intrusion past the barrier or fence constitutes an actual danger in only a limited number of instances, and thus, for instance, the textile machine is unnecessarily shutdown too often. A further drawback of such prior art apparatuses is that large foreign bodies, even humans, located at the region of the row of bales, cannot be detected prior to turning on the safety barrier.

In order to prevent such drawbacks, there have been disclosed safety equipment which use mechanical and/or sensor means for fencing off or shielding only the immediate vicinity of the potentially dangerous opening rollers. Here, the barrier or fence moves in conjunction with the machine frame and the opening roller. Such type safety equipment has been disclosed, for example, in the commonly assigned European Published Patent Application No. 90810018.3, published Jul. 25, 1990 under European Published Patent No. 379,465. The therein disclosed safety equipment seals off by mechanical and/or sensor means all locations where the danger region beneath the opening member is not obturated by the floor, by mechanical components or the bales, resulting in complete closing off of such region. However, since fencing off of this dangerous region by the floor and the bales is dependent to a great extent upon the configuration of the row of bales, the additional barriers, especially the sensors, must be coordinated to the shape of the row of bales, and this bale row shape, in the case of irregular bales in the bale row, continually changes during movement of the bale opening machine. Even though such disclosed prior art safety equipment affords a considerable degree of operational safety along with maximum degree of mobility of the operating personnel, still such safety equipment is quite complicated in design and expensive in construction, since it must be controlled as a function of the actual shape of the row of bales which is momentarily being opened. Without such a control, bales or parts of bales would be construed as an unauthorized intrusion into the monitored area. Hence, complicated control mechanisms are required, which not only renders the machine construction more complex, but, in turn, results in new safety risks.

Reverting now again more specifically to the potentially encountered risks at such bale opening machines, these may be basically classified as follows: Firstly, there exists the risk of the bales being too narrow, that is to say, bales not extending over the full width of the opening member. In this case there is a so-to-speak projection of the opening roller beyond the textile fiber bales to be worked. There is also a risk in the lateral regions of the opening member, that is to say, on the sides in the advance direction of the opening member. Difficulties are encountered in fitting protective means to such bale openers. Particularly in the case of mechanical protective means the problem arises that they do not engage with the bales or may collide with other mechanical means.

Problems also occur with sensory protective means, because, for example, modifications of the bale profile or bales are detected as penetrating objects. Thus, in the case of the known sensory protection concepts, either the bale opener (including the complete bale row) is monitored as an entity, or the sensors only detect limited areas over the bales, so that once again only an incomplete protection is provided.

Another protective device is known from German Published Patent Application No. 3,733,972. A live electric conductor is passed around the opening member and generates an electromagnetic field. The field change brought about by an approaching person is established by a control device, which then operates a limit switch. However, as the arrangement possibilities of the conductor are limited, this device can only cover a limited area, which is fundamentally restricted to a zone above and to the side of the opening for the opening rollers. It is particularly disadvantageous that a person penetrating from below into the danger area may not even be detected, or the measuring field must be extended to such an extent that once again zones around the opening member are also detected, which leads to unnecessary interruptions. It does not solve the problem that bales are detected by the sensor if the field is extended. Thus, from the constructional side, only a limited area over the bales can be monitored, which means that protection remains incomplete. The self-monitoring question is also unsolved.

In addition, mechanical protective flaps or covers for opening rollers are known. These are located within the opening member casing or housing. With more recent constructions of opening members equipped with several, for example, two opening rollers, such a means cannot be realized for space reasons.

It has been found that the actual danger area for a bale opener is relatively small and essentially only consists of the zone or area below the opening member or opening rollers. Therefore the monitoring zone should correspond to this danger zone or area, particularly if corresponding safety or protective means are located outside the opening member casing or housing. Account is not taken of this by the known means.

SUMMARY OF THE INVENTION

Therefore, with the foregoing in mind, it is a primary object of the present invention to provide an improved safety apparatus for a traveling unit of a textile machine and a method of operating such textile machine, which is not afflicted with the previously considered limitations and drawbacks of the prior art.

Another and more specific object of the present invention aims at providing an improved safety apparatus for a traveling unit of a textile machine and a method of operating such textile machine, especially a bale opening machine, which operates autonomously without needing a complicated control, but nonetheless effectively precludes access to regions beneath the revolving opening rollers, or in the event of such unwanted access or entry reliably interrupts further rotation of the opening rollers or stops the bale opening machine.

Still a further noteworthy object of the present invention is the provision of an improved safety apparatus for a traveling unit of a textile machine and a method of operating such textile machine, especially a bale opening machine, which provides a self-monitoring or self-checking operation of the safety apparatus.

It is yet another significant object of the present invention to provide a safety or protection apparatus which ensures reliable protection of the danger zone or area, the monitoring zone being kept to a minimum in optimum manner.

In accordance with the invention the problematical danger zone or area is reliably shielded or screened by sensors and/or mechanical means, so that it is not possible to enter such zone or area without this being detected or prevented by the safety or protection device. The invention makes it possible to completely close the monitoring zone or area. The protection equipment is also designed in such a way that varying bale profiles have no disturbing influence on it.

Another important feature is that the safety or protection apparatus monitors itself, that is to say, failures of sensors lead to no reduction in the security or protection effect and/or are immediately detected. In addition, the safety or protection apparatus is arranged in such a way that the monitoring zone or area is only slightly larger than the danger zone or area. This avoids unnecessary disconnections or interruptions in the operation of the textile machine. The safety or protection apparatus simultaneously has the advantage that it is also usable for opening members working with two or more opening rollers, or with a special geometrical shape.

According to a particularly advantageous construction, the safety apparatus for a traveling unit of a textile machine of the present development comprises monitoring means which monitor at least a part of a danger zone or area such that an object located in the danger zone or area stops the traveling unit of the textile machine. The monitoring means comprises at least one transducer, especially an electro-acoustical or ultrasonic transducer operatively connected with a control unit. The at least one electro-acoustical transducer transmits an acoustical or ultrasonic signal, and means, such as the at least one electro-acoustical transducer receives an acoustical (ultrasonic) signal reflected by an object or person located in the monitored zone or area. Additionally, there are provided means for dividing the transmitted acoustical signal into an acoustical measuring signal which is directed towards the zone or area to be monitored and an acoustical reference signal. This acoustical reference signal is directed towards a reference reflector located at a predeterminable spacing from the electro-acoustical transducer. Still further, the reference reflector is located above the electro-acoustical transducer. In the context of this disclosure, the term "reflector" is broadly used to means any element or component which returns at least part of the transmitted acoustical (ultrasonic) signal.

As will be evident from what has been previously explained, each part or a rotating opening roller which is not covered or shielded constitutes a potential danger source. The entire zone or area through which the opening member can move and within which there is also located the entire bale row to be opened, contains potential danger zones or areas. When the opening member or a part thereof is located in a potential danger zone and if there are not provided any safety measures, then free access to the rotating opening roller is possible, and there exists a real danger. As previously discussed, potential danger zones or areas are present at the ends of the row of bales, above the bale row, in gaps or spaces between bales of the bale row, and along the lengthwise sides of the row of bales, especially at those locations where there are positioned bales whose bale width does not correspond to the maximum possible bale width. These potential danger zones or areas can be conveniently classified into two groups: As to the potential danger zones or areas of the first group, namely, the ends of the bale row, the area above the bale row, and gaps or spaces between bales of the bale row, the casing or housing opening for the opening roller or rollers, is not covered by the row of bales throughout the entire length or axial extent of the opening roller or rollers. Regarding the potential danger zones or areas of the second group, namely, laterally of the row of bales, the housing opening is only partially closed off by the top surface of the bales of the row of bales.

According to a particularly advantageous construction, the inventive safety apparatus can comprise three parts or units. One part or unit detects potential danger zones or areas of the first group and initiates measures precluding that such potential danger zones or areas can become an actual danger. A further part or unit fences off the opening roller or rollers at the side confronting the machine frame such that at the potential danger zones or areas of the second group at the lengthwise side of the bale row confronting the machine frame, there can not arise any actual danger. A third part or unit carries out the same function at the lengthwise side of the bale row facing away from the machine frame.

Each of the three parts or units of such construction of the inventive safety apparatus, can be realized by means of an electro-acoustical transducer or a group of electro-acoustical transducers and an appropriate control unit or device as an autonomous and self-checking unit. Furthermore, the present invention provides the flexibility of combining partial safety apparatuses containing electro-acoustical transducers with other safety apparatuses containing, for example, mechanical barriers or shields or fences, or barriers or shields or fences established through the use of other sensors. Additionally, while it is advantageous to have the transducer contain both a transmitter and receiver as a unit, it is conceivable to use separate transmitter and receiver components or devices.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 5 is a front elevational view depicting a mechanical protection device to prevent access from the front of the bale opener by means of a vertically arranged protective shield;

FIG. 6 shows a mechanical protection device which protects against entry of foreign matter or objects into the danger area by means of a frontal, horizontally positioned protective shield;

FIG. 9 shows an embodiment of a mechanical protection device with laterally arranged, pivotable protective plates;

FIG. 10 shows an embodiment of a mechanical protection device with laterally arranged, pivotable protective plates guided on guide rollers;

FIG. 11 illustrates a mechanical protection device constructed as a elevationally displaceable, particularly a lowerable grating;

FIG. 12 illustrates another form of mechanical protection device with a flexible cover which can be brought over the opening rollers;

FIG. 23 is a schematic top plan view of a textile machine, here again a bale opening machine or bale opener and a row of bales to be opened, for depicting the potential danger zones or areas;

FIG. 24 is a schematic side view of the bale opening machine and the row of bales to be opened of FIG. 23, for depicting the potential danger zones;

FIGS. 27, 28 and 29 are respective detail sectional views through safety or protective apparatus containing an electro-acoustical transducer, as such can be employed in the arrangement of bale opening machine depicted in FIGS. 25 and 26, with FIG. 27 being a sectional view along the line 27—27 of FIG. 28, and FIG. 28 being a sectional view along the line 28—28 of FIG. 27;

FIGS. 30, 31 and 32 are respective detail sectional views, like the illustrations of FIGS. 27, 28 and 29, through a safety or protective apparatus which here, however, contains two electro-acoustical transducers, as such can be employed in the arrangement of bale opening machine depicted in FIGS. 25 and 26, with FIG. 30 being a sectional view along the line 30—30 of FIG. 31, FIG. 31 being a sectional view along the line 31—31 of FIG. 32, and FIG. 32 being a sectional view along the line 32—32 of FIG. 30;

FIG. 37 schematically illustrates an embodiment of safety apparatus containing sensor means for creating a safety barrier or fence or shield substantially parallel to the top or upper surface of the row of bales as viewed in a direction substantially parallel to the direction of movement of the bale opening machine;

FIG. 38 schematically illustrates in top plan view the embodiment of safety apparatus containing sensor means depicted in FIG. 37;

FIG. 39 schematic top plan view, like the showing of FIG. 23, but depicting a variant embodiment of the present invention; and, FIG. 40 is a schematic side view, like FIG. 24, of the variant embodiment depicted in FIG. 39.

DETAILED DESCRIPTION OF THE PREFERRED EMBODIMENTS

Describing now the drawings, it is to be understood that only enough of the construction of the different exemplary embodiments of safety or protective apparatuses for a traveling unit of a textile machine has been depicted therein, in order to simplify the illustration, as needed for those skilled in the art to readily understand the underlying principles and concepts of the present invention.

Figure 1:
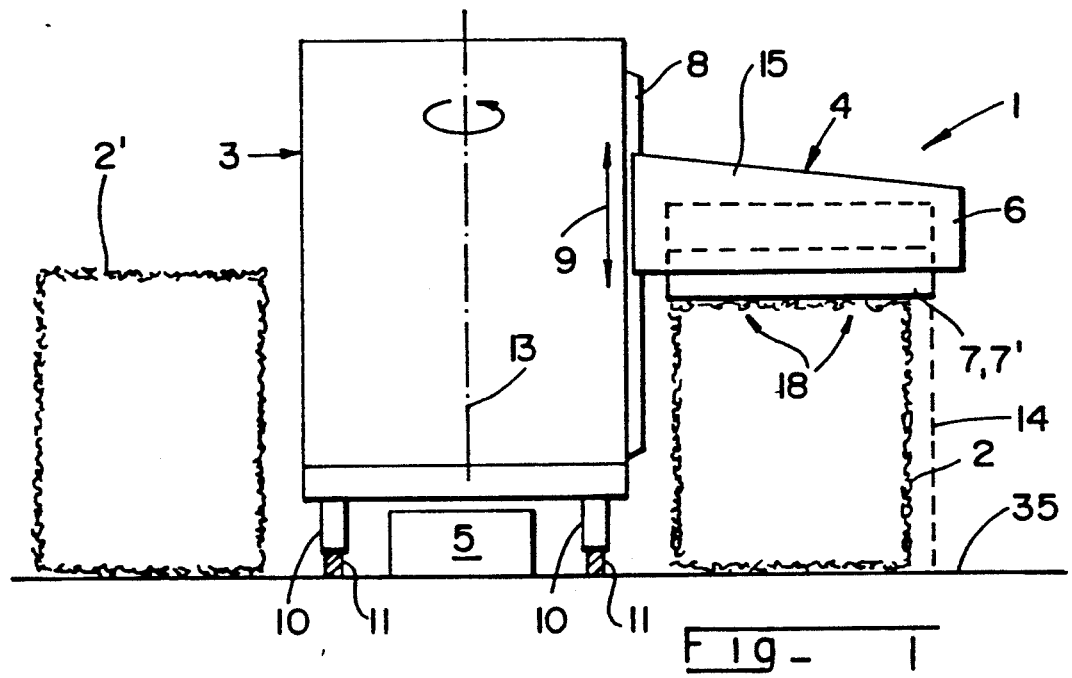
FIG. 1 shows a textile machine, here a conventional textile fiber bale opener or bale opening machine in side view.
Figure 2:
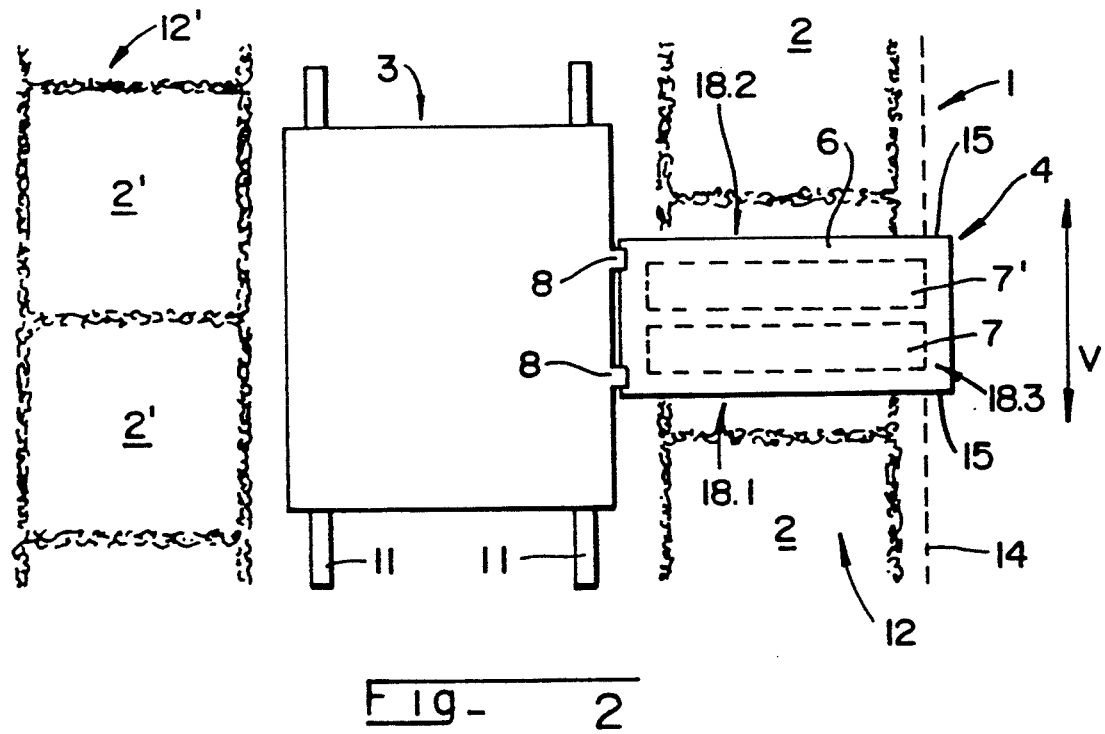
FIG. 2 shows the same bale opener from above, the danger zone or area being hatched.

FIGS. 1 and 2 illustrate an example of the construction of a textile machine having a travelling unit, here depicted in the form of a convention textile fiber bale opening machine or bale opener 1 in side view (FIG. 1) and from above (FIG. 2). This bale opening machine 1 for opening textile fibers, such as cotton fibers in the form of bales 2 and 2' comprises a machine frame 3 with an opening member 4 and a flock transport channel 5. The machine frame 3 together with the opening member 4 can be moved in two advance directions V.

The opening member 4 comprises a casing or housing 6 in which there are drivably mounted one or more rotary or rotatable opening rollers 7 and 7'. The fiber flocks opened or extracted from the fiber bales 2 of the bale row 12 by the opening rollers 7 and 7' are passed through the casing or housing 6 and conveyed by a not here shown but conventional ventilation means into the flock transport channel 5. Opening member 4 is displaceable along a guide rail or track 8 in the vertical direction (indicated by arrow direction 9 in FIG. 1), so that it can be placed on the bale, raised therefrom and moved through a variable opening height. In addition, the upper part of the casing or housing 6 is rotatable about a vertical axis 13, so that the opening member 4 can be rotated by 180 degrees, in such a way that a second row 12' of fiber bales 2' arranged on the opposite side can be opened.

The machine frame 3 is provided on the underside with drivable wheels 10 making it possible to move the textile fiber bale opener 1 on rails or rail structure 11 along each of the fiber bale rows 12 and 12' (Cf. FIG. 2). The rails 11 are fitted directly on floor 35 of the textile mill or some other appropriate base. By reciprocating the complete bale opening machine 1 and simultaneously lowering the opening member 4, it is possible to open in layerwise manner the fiber bales 2 and 2' in the corresponding bale row 12 and 12'. The fiber flocks are continuously supplied for further processing by means of the flock transport channel 5.

The opening rollers 7 and 7' of opening member 4 are designed in such a way that they coincide as accurately as possible with the width of each of the fiber bale rows 12 and 12', as indicated by the broken line 14 in FIGS. 1 and 2. This corresponds to a standard width. As a result of the provision of side plates 15 the rotary opening rollers 7 and 7' are largely concealed or covered during bale opening, because the side plates 15 of casing or housing 6 cover opening rollers 7 and 7' over their entire length, apart from an opening on the underside, which is free for bale opening purposes.

However, despite standardization, the width of a fiber bale row, like the bale row 12 is always somewhat smaller than that of the opening rollers 7 and 7', as is made apparent by line 14, which is shown in a somewhat exaggerated form. Between the opening roller 7 and the edge of the fiber bale row 12, at the front a free space is left in which, during operation, the rapidly rotating opening rollers 7 and 7' equipped with flock extraction or opening elements, such as picking pins are accessible to a greater or lesser extent, so that a danger area 18 is formed at the front.

The rapidly rotating, for example, picking pin-equipped, opening rollers 7 and 7' of opening member 4 also constitute a considerable hazard in the lateral areas of the opening member 4 as soon as the latter is, for example, extended beyond or raised from the associated bale row.

Thus, for the operating personnel a danger zone or area 18 exists which, during operation, can be penetrated with the hands of workers or by a tool. Safety considerations make it important to prevent such penetration or access.

The present invention provides safe and reliable safety or protection features for the entire danger zone or area, that is to say, the front zone or region 18.3 and the lateral zones or regions 18.1, 18.2 thereof.

In accordance with the invention, the danger zone or area 18 is shielded with mechanical means and/or protective measures are provided by sensor means, that is to say, in particular the rotary movement of the opening rollers 7 and 7' is switched off as soon as a foreign object approaches the danger zone or area 18. Account is taken of the fact that with the described geometry of the bale opener the danger zone or area is located below the casing or housing 6 of the opening member 4.

Although the invention is illustrated with particular reference to the aforementioned bale opening machine or bale opener 1, some of its features can also be used with other textile machines. Some features of the invention can be used with other types of bale openers or with other types of working or processing machines, particularly movable working machines. For example, it is possible to arrange a bale opener in rigid manner and to move the bales on a conveyor belt relative to the machine.

Figure 3:
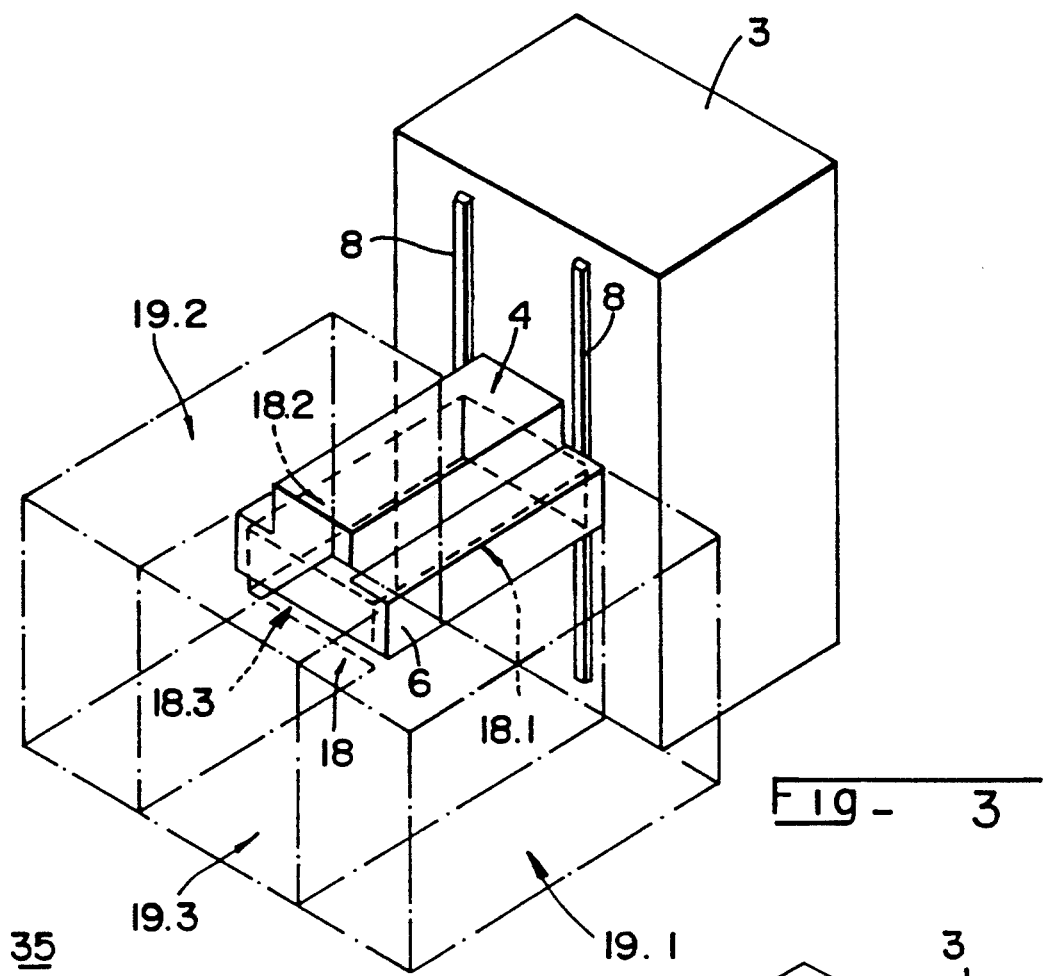
FIG. 3 illustrates diagrammatically a bale opener provided in accordance with the present invention with two lateral monitoring zones or areas.

FIG. 3 diagrammatically shows a concept of the present invention. The actual danger zone or area 18, which covers the opening rollers, is indicated by a broken line. It is clear that a large part of the danger area 18 is covered by the casing or housing 6 of opening member 4. Thus, a risk of injury for operators or damage to the rollers by penetrating objects can only take place from below. It is possible to see three zones or regions in this lower area. These are constituted by the front zone 18.3 and the two lateral zones 18.1, 18.2, which are in each case located in direction in advance of the opening member.

According to the invention, safety or protective measures are to be taken for the entire danger zone or area 18. In other words it must be ensured that a penetration of the lower, lateral danger zones 18.1, 18.2 and the front danger zone 18.3 is prevented. According to the invention in order to achieve maximum protection, a monitoring zone or area is shielded by mechanical safety or protective means and/or is monitored by sensors in such a way that the thus defined monitoring zone or area, together with solid components (casing and so forth), floor and any additional safety or protective means forms an uninterrupted transition or is closed. Thus, it is sought to surround the danger area by topologically closed protective envelope comprising sensor areas, mechanical safety or protection means and possibly further solid elements (bales, machine and so forth). Thus, the monitoring area is closed.

For this purpose, according to the invention, a topologically closed monitoring area is provided, which covers the lateral zones 19.1, 19.2 and the front zone 19.3. This ensures that an object cannot laterally or frontwise penetrate the danger area 18, without being prevented from doing so by mechanical protection means and/or detected by the sensors. When an object approaches the danger area and is detected by the sensory safety or protective means, protective measures are taken, for example, the opening rollers are stopped by a rapid or emergency disconnection. The penetration of objects is prevented in the following way. The first alternative is that the object is prevented from penetrating the danger zone or area by mechanical protection means. In zones or areas where it is not possible to locate mechanical protection means or their effect is limited, monitoring is brought about by sensory protective means. Finally, fixed machine parts, bales and so forth are incorporated into the safety or protective concept, that is to say, they take over the function of a mechanical protection. In certain circumstances, the effect of mechanical and sensory protective means can be combined at particularly exposed points, that is to say, an active redundancy of the safety or protection means is obtained there.

In those zones of the monitoring area which are detected by sensory protection means, it is necessary to bring about early detection of an object, so that the safety or protective measure can be taken in good time and enable its action to develop. The reason for this is the mechanical inertia inherent in the machine. Therefore, the monitoring zone or area 19 must generally be larger than the danger zone or area 18. The zone or area 19.1, 19.2, 19.3 to be monitored and which is positioned upstream of the danger zones or areas 18.1, 18.2, 18.3 is diagrammatically indicated in FIG. 3 by dot-dash lines. The size and shape of the monitoring area can vary and are to be determined as a function of the largest possible relative speed between the danger zone or area and the penetrating object (for example, hand) and the time necessary to eliminate the danger source. The danger zone or area must respect a generally prescribed safety distance (for example, arm length). The invention takes account of the requirement for an optimized monitoring zone or area, that is to say, in the case of high security the monitoring zone or area can be minimized, so that in operation no unnecessary disconnections occur.

Figure 4:
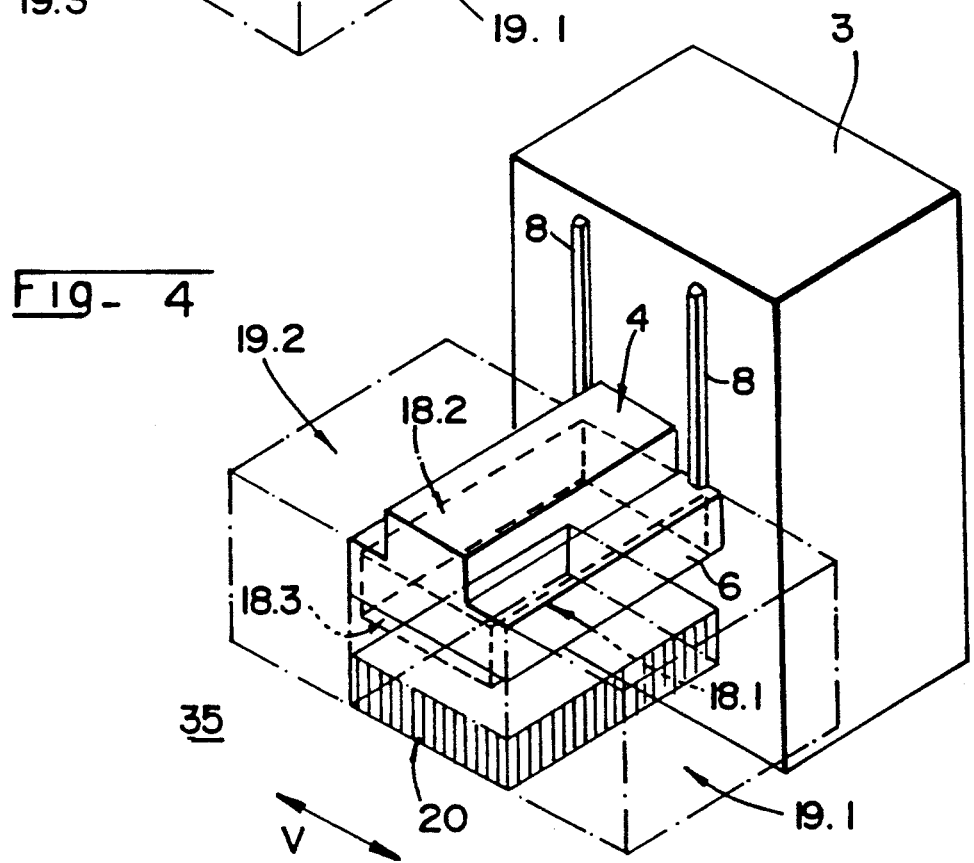
FIG. 4 shows diagrammatically a bale opener with two lateral monitoring zones or areas and an intermediate monitoring zone or area.

The regional monitoring zone or area 19.1, 19.2, 19.3 shown, for example, in FIG. 3 forms an uninterrupted transition to the machine frame 3, the casing or housing 6 and the floor 35. Unlike the case of conventional protection means, there is no possibility of getting around it and entering the danger zone or area. The invention obviously offers the possibility of arranging the monitoring zone or area in different ways. In particular, the lateral monitoring zones 19.1, 19.2 need not reach the floor (FIG. 4). This involves the provision of an additional monitoring zone 20 located below the opening member 4 and which uninterruptedly connects the two lateral zones 19.1, 19.2. This monitoring zone or area 20 is monitored in the same way by means of a protective curtain running approximately parallel to a horizontal plane or to the working surface of the machine.

Particularly endangered points can be very reliably protected by mechanical safety or protection means. In addition, for monitoring purposes several sensors can be arranged in such a way that they form at least one safety or protective curtain which, in combination with the solid parts (floor, machine frame and so forth) and possibly such mechanical safety or protection means, completely cover the monitoring zone or area. Thus, the mechanical and sensory protection means form the topologically closed monitoring zone or area. However, it must be borne in mind that both sensory protection means and mechanical protection means can be provided in preferred embodiments of the invention in individual form.

For ease of understanding, and with particular reference to FIGS. 1 to 22, the description is divided up in the following way:

1. Mechanical protection means (without additional sensor protection means).
   a. Mechanical protection means for the front area.
   b. Mechanical protection means for the side area.
   c. Mechanical protection means for the front and side areas.
2. Sensory protection means (without additional mechanical means).
   a. Sensory protection means for the front area.
   b. Sensory protection means for the side areas.
3. Combination of mechanical and sensory protection means.
4. Self-monitoring.

1. Mechanical Protection Means (without additional sensory protection means)

When using mechanical safety or protection means for defining or restricting the monitoring zone or area, account must be taken of the fact that the bale opening zone or area, that is to say, the working zone or area must not be impeded during the working process and no problems must arise regarding the varying bale profiles in the bale row. As the opening member is moved along the bale row during the opening process, a particular problem is formed by the lateral shielding of rollers, that is to say, in the movement direction. Within the scope of the invention the safety or protection possibilities are to be provided on the opening member or on the bale opener. This offers a constructional advantage, in that no additional self-supporting or free-standing means are required.

The danger zone or area below the opening rollers must be so protected by mechanical means that no impediment occurs on advancing the opening member over the bales. On the other hand the monitoring zone or area covered by them corresponds as far as possible to the danger zone or area. For this purpose, downwardly projecting mechanical protective shields are provided on the lateral and/or frontal zone or areas of the opening member or protective means shielding the danger zone or area are provided directly below the opening rollers, so that persons or their limbs cannot enter the hazard zones of the opening rollers. To be able to take account of varying bale profiles and other bale irregularities, these protective means must behave in a neutral manner with respect to the bales. This means that the protective means must either avoid bale obstacles (lateral flanks of following bales), or must be passed over the bale profile.

The advantage of mechanical protection means is that they render impossible a penetration of the danger zone or area, so that there is no need to interrupt the working process. A further advantage is their high reliability, so that it is only necessary to provide self-monitoring in exceptional cases. According to the invention fixed or movable mechanical protection means are used. A further advantage thereof is the clear visibility of the protection means and therefore the danger zone or area.

A. Mechanical Protection Means for the Front Area

FIG. 5 shows an example of a mechanical shielding device in accordance with the invention for the front zone or area of opening member 4. The textile fiber bale opener 1 with the opening member 4 is shown in front view. A safety or protective shield 31 is fitted to the front of the opening member 4. As shown by double-headed arrow 32, shield 31 is vertically adjustable by means of guides 33 and is so stopped by a stop 34, that the danger zone or area 18 is completely covered and consequently frontal access to the rotating opening roller 7b is prevented. In addition, protective shield 31 is sufficiently wide that access in a sloping manner from the front is rendered impossible. When a fiber bale 2 has almost been completely opened, protective shield 31 rests on the floor 35. Due to the displaceability of the protective shield 31 along guides 33, which requires a certain minimum force, the vertical movement of the opening member 4 during further bale opening is not prevented, so that the bales can be completely opened. The lower edges of the protective shield 31 are provided with bevels 38, so that during the rotation or swiveling of the opening member 4 (by 180 degrees relative to axis 13) it can be raised on the other side for processing a row of fiber bales located on the opposite side.

The vertical position of the opening member 4, that is to say, its height above the floor 35, is determined by the machine control. The height setting control signal can be used for controlling the protective shield 31. Thus, apart from a passive vertical displacement of the protective shield 31, it is also possible to bring about a displacement of the distance between shield 31 and floor 35 in the vertical direction by a motor, pneumatic or hydraulic device 37 as a result of the control signal which is present in any case.

Another mechanical safety or shielding device in accordance with the invention for the front danger zone or area 18.3 is shown in FIG. 6. The opening member 4 and the fiber bales 2 arranged in a row 12 are shown in plan view. A protective shield 41 horizontally displaceable in the axial direction 42 of opening roller 7 is located directly below such opening roller 7. The protective shield 41 is, for example, moved along two guides 43 in such a way that a frontal free space 48 below the rotating opening roller 7 unscreened by the bale surface is always covered.

The displacement of the protective shield 41, which slides in the manner of a slide or carriage on the outside of the fiber bale 2, can once again take place passively by moving the protective shield 41 along bevels 44, for example, against a spring tension, or actively by means of distance sensors 45 and a motor, hydraulic or pneumatic drive 46.

The protective shield 41 can either be constructed in a rigid manner or can be rolled up in the form of a roller shutter. In the case of the latter construction, it can be completely housed below the front cover 47 of opening member 4.

Figure 7:
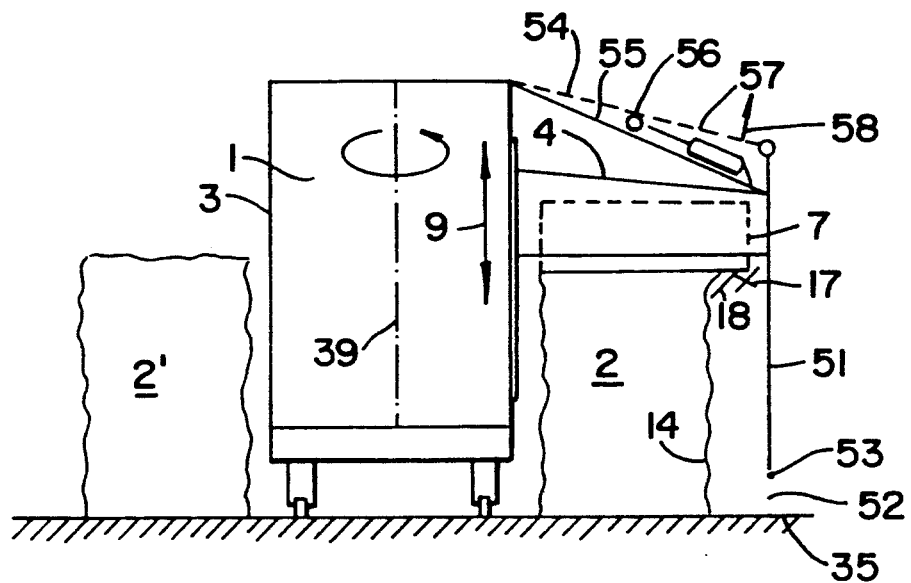
FIG. 7 shows another mechanical protection device formed by a mechanical protection curtain which is spread over the opening member.

A further mechanical shielding device in accordance with the invention is shown in FIG. 7. It comprises a mechanical protective curtain 51, which is spread over the opening member 4. It hangs down at the front over the opening member 4 and conceals the access to the danger zone or area 18.3 (see, for instance, FIG. 2) of opening roller 7. If the mechanical protective curtain 51 is fixed to the machine frame 3 at the top, the distance 52 from the curtain lower edge 53 to the floor 35 is, for geometrical reasons, independent of the position of the opening member 4 displaceable in the vertical direction 9. The mechanical protective curtain is always manually raised during the changeover to the other parallel bale row 2'.

A mechanical solution can be adopted in place of manual raising. For example, the mechanical protective curtain 51 can be fixed to a pivoting member 54, which can be raised in arrow direction 58 by a roll 56 supported on the cover surface 55 of opening member 4 and which engages under the pivoting member 54. In turn, roll 56 is moved by a controlled cylinder-piston unit 57 connected thereto.

B. Mechanical protection Means for the Side Areas

Figure 8:
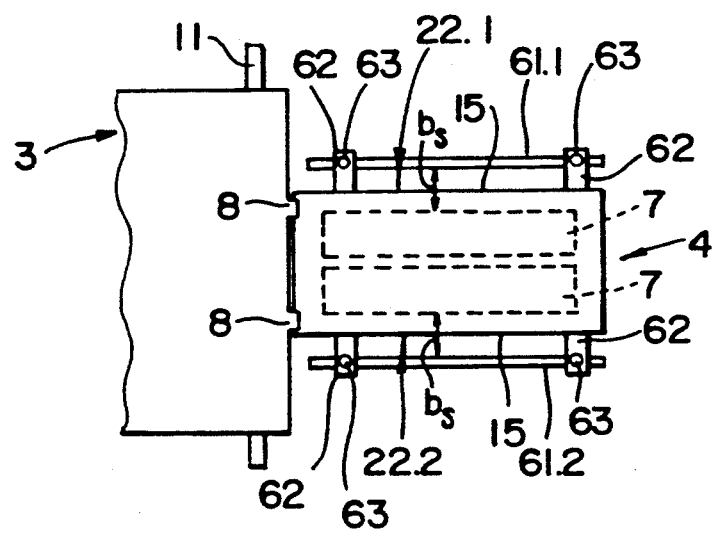
FIG. 8 illustrates a mechanical protection device to prevent lateral access by means of flexible protective plates.

A first illustrative embodiment of a preferred mechanical protection device in accordance with this invention for the side zones or areas is shown in FIG. 8. The bale opener 1 with the opening member 4 positioned over a bale 2 is shown from above. On both sides of the opening member 4 with opening rollers 7 and 7' protective shields 61.1 and 61.2, respectively, are fixed at a certain distance $b_s$ from said opening rollers or the lateral danger zones 22.1 and 22.2, respectively. These protective shields 61.1 and 61.2 preferably are made from a flexible material such as rubber, soft plastic, or have a lamellar construction. In order to be able to ensure reliable protection, it is necessary that the distance $b_s$ between the protective shields 61.1 and 61.2 and the side plates 15 is large enough to ensure that a person with a stretched out arm cannot enter the danger zone or area 18 and is, for example, 85 cm. This distance $b_s$ is in turn dependent on the geometry and size of the protective shields 61.1 and 61.2. It must be borne in mind that the protective shields need not necessarily be constructed as flat plates and instead they are preferably adapted to the necessary protection or monitoring zone or area and, for example, have an appropriate bend. The protective shields project downwards only to the extent that they can be passed over the bales to be worked and cause no impediment in the conveying direction. Preferably the protective shields 61.1 and 61.2 in their mounting supports 62 are vertically displaceable by means of guides 63. As soon as the opening member 4 has been passed out over the end of a bale, the corresponding shield is lowered, so that there is also a good protection laterally from below. The movement of protective shields 61.1 and 61.2 over the fiber bales can be assisted with guide rollers. As a result of their own weight, or actively assisted by a drive, the protective shields 61.1 and 61.2 are lowered. An electric motor or a hydraulic mechanism can be provided for raising or optionally lowering.

In a modified embodiment the protective shields or plates can also be horizontally adjustable. On this occasion the protective shields 61.1 and 61.2 or their guides 63 are kept spaced from the casing or housing 6 on telescopic arms. This makes it possible to move the opening member over a fiber bale to its end flank, even if the next bale has a greater height and the corresponding protective shield 61.1 and 61.2, during the advance, abuts against said following bale. For this purpose a sensor can be provided, which under specific predeterminable conditions releases the horizontal movement of the protective shield with respect to the casing or housing 6 of opening member 4. The criterion can be, for example, a counterpressure on the protective shield constant over a specific time. For this purpose a conventional pressure-dependent sensor is provided on the opening member 4 or protective shields 61.1 and 61.2.

Another preferred embodiment of a mechanical protection device in accordance with the invention is shown in FIG. 9. Laterally of the opening member 4, protective shields or plates 61.1 and 61.2 are fitted in an articulated manner to arms 71.1 and 71.2, respectively, connected to the opening member 4. Each of the ends of these arms 71.1 and 71.2 have at least one guide roller 72.1 and 72.2, respectively. If the opening member 4 is moved in the direction of arrow F over a first bale 2.1, then the arm 71.1 located in the movement direction would after a certain time, abut against the edge of a second bale 2.2, which here, for example, has a higher flank. However, guide roller 72.1 brings about a mechanical raising of the protective shield 61.1 as soon as it comes into contact with an obstacle, so that the opening member 4 can open up the entire bale up to its flank 77. In the present example the protection shields 61.1 and 61.2 have slots for the corresponding guide rollers 72.1 and 72.2. In order to prevent the protective shields from abutting against the following bales, they are arranged in rotary manner about a horizontal axis a. To ensure that the protective shield is not rotated by a person approaching the danger zone or area, a security means is provided. This can once again be a sensor, which records specific conditions for freeing the protective shield (for example, infrared sensor), or the freeing of the protective shield is controlled by means of the known bale profile. It is obviously also possible to set back the protective shields with respect to the guide rollers, so that in the case of difficult profiles to prevent an abutment of the protective shields. As soon as a protective shield is once again located over a bale, it is returned to its original position by means of a drive or by spring tension.

To prevent a dropping of the protective shields or plates 61.1 and 61.2 into the bale gaps 75, an additional measure is provided. This can consist of a sensor-monitored elevating or raising/lowering device 74.1 and 74.2 or a wire pull. This raising device simultaneously makes it possible to support the protective shields or plates during raising, or to prevent in the case of difficult bale profiles an abutting and jamming of the arms 71.1 and 71.2 or protective shields or plates 61.1 and 61.2. According to a preferred embodiment the pivoting of the protective shield or plate located in the advance direction (for preventing abutting against the following bale) is coupled to the raising device, so that on raising the protective shield or plate is automatically pivoted into the necessary position.

FIG. 10 shows another embodiment similar in principle to the embodiment according to FIG. 4. However, in this case the protective shields 61.1 and 61.2 are raised and lowered not through establishing a higher flank of the following bale, but by guiding the protective shields or plates along the bale profile. The protective shields 61.1 and 61.2 are fixed to the end of the arms 71.1 and 71.2, respectively. The guide rollers 72.1 and 72.2 are mounted on the lower edge of the protective shields 61.1 and 61.2, respectively. If a protective shield 61.1 or 61.2 is guided over a bale flank and therefore slightly lowered, this can be used as a signal for detecting the bale flank (establishing the bale profile). If there is a larger gap 75 between two bales 2.1 and 2.2, a motor operated elevating or raising/lowering device 74.1 and 74.2 prevents an excessive lowering of the protective shields 61.1 and 61.2. As the bale profile is known at the latest following a first opening process pass in one direction, the protective shields 61.1 and 61.2 are not raised at the end of the bale distance, so that there is then an optimum protection of the danger zone or area in the downward direction. It is obviously possible in the variants according to FIGS. 9 or 10 to correspondingly control the raising and lowering of the protective shields 61.1 and 61.2 in the case of a known bale profile. In both variants the lowering of the protective shields 61.1 and 61.2 takes place by their own weight or by the weight of their suspensions, or is additionally assisted by spring means. In addition, if necessary, the guide rollers 72.1 and 72.2 can be driven in both variants, so that any compressive forces on the bales are reduced.

The aforementioned safety or protection means are characterized by covering the danger zone or area laterally or laterally from below. A particular advantage of the safety or protection means according to FIGS. 8 to 10 is that these safety means maintain an adequate safety distance, for example, an arm length from the danger zone or area and not only prevent the approach of a person, but also prevent rapid insertion of limbs into the danger zone or area.

On operating a bale opener with such mechanical protection means, the following procedure can be adopted. To prevent the mechanical devices engaging with bales during the advance of the bale opener, they can be guided along the profile with mechanical guide means, preferably guide rollers. The known bale profile is used for guiding the mechanical protection means. A signal determined in the conventional manner and representing the bale profile is used for controlling the movement of the mechanical protection means. As far as is necessary, the corresponding operation can be assisted with drive means.

C. Mechanical Protection Means for Front and Side Areas

Also, mechanical protection means can be used for monitoring the entire danger zone or area 18. Such an embodiment is shown in FIG. 11. An elevationally displaceable, specifically a lowerable grating 81 is fitted to the opening member 4 below opening rollers 7 and 7'. Under the effect of the counterpressure of the fiber bale to be opened up or controlled in sensory manner, the grating 81 is raised into the indicated working position 82 and thereby frees the tearing pins of the opening rollers. If the opening member 4 is not in contact with a bale, the grating 81 drops as a result of its own weight or assisted by spring tension into the lower position 83 and therefore covers the danger zone or area 18. It is obviously also possible to actively assist the grating 81 by a raising/lowering device. In order to ensure a grating position adaptation in the case of larger profile jumps between two bales, guide rollers can also be provided on the grating 81, which, for example, run along its lateral edges in the bale profile advance direction. In order to ensure that the grating 81 exerts its protective function when the opening member 4 only partly laterally projects over a bale, according to a preferred embodiment a multipart grating is provided. In the case of, for example, two opening rollers 7 and 7', the grating 81 is subdivided into two parts in such a way that one grating part can be lowered as soon as one opening roller passes over a bale edge. For this purpose the grating is, for example, split along line X in FIG. 11.

FIG. 12 shows an embodiment having a mechanical shielding device with a foil-like or lamellar cover. The opening member 4 is once again shown in front view. Laterally of the opening rollers 7 and 7' there are fitted deflecting guides or rollers 69, which make it possible to draw a lamellar or flexible cover 68 below the opening rollers 7 and 7'. In this way it is possible to ensure that the rotating opening rollers are always concealed or covered, when not in contact with the fiber bales. A motor drive 64 is used for moving the cover 68 and by means of a not shown motor drives the rollers 65 for rolling up the cover 68. The latter has at least one recess, which can be so positioned that, during operating, the rollers 7 and 7' can engage freely against the bale. In order to increase the resistance of the cover 68 against any pressure from below, it is possible to provide one or more abutments 67 for such cover 68. Cover 68 can also be made in one piece which, if necessary, is drawn over the opening for the opening rollers 7 and 7'. If the cover 68 has a recess, it can be, for example, made in two-part form with a central working slot 66, the parts then being connected by bands, which run past the end faces of the rollers 7 and 7'. In the case of a sensory detected danger the cover 68 is drawn over the danger zone or area 18, or the two-part cover is moved in such a way that the opening rollers are no longer accessible through the working slot 66.

It is a common feature of the mechanical protection means that they are either arranged in such a way that they cannot from the outset impair the processing of the bales, or are arranged in movable manner, so as to constitute no impediment over a bale when the opening member 4 is in the working position. Their movement can be brought about by gravity and corresponding guide means, preferably guide rollers 72.1 and 72.2 running along the bale profile or their movements are assisted in motor, hydraulic or pneumatic manner. In a preferred embodiment the movement of the mechanical protection means is controlled as a function of the bale profile configuration known with many bale openers. For this purpose the corresponding drive of the mechanical protection means is supplied with a bale profile-representing signal. Correspondingly this signal can also be determined by distance sensors on the opening member 4, unless the signal is otherwise already available.

The mechanical protection means exert their action firstly as soon as the opening member 4 with its danger zone or area is located in a free position. However, even in the working position, the mechanical protection means have a location such that a lateral insertion in the danger zone or area is impossible. For this purpose, the protection means, for example, the protective shields 61.1 and 61.2 are guided as closely as possible over the bale 2. This leads to a substantially uninterrupted transition between the bale to be processed and the opening member 4, which ensures optimum security. The guide rollers or raising/lowering means also lead to a good following of the protection means along the bale profile.

2. Sensory Protection Means (without additional mechanical protection means)

The sensors can be, for example, feelers, unidirectional systems or distance measuring devices having an optical, radar, ultrasonic or infrared basis. Express reference will not always be made to this in the following description part. However, preference is given to the use of sensors which do not detect the bales (e.g. infrared sensors), making it possible to directly establish the penetration of a person into the monitoring zone or area. It must also be ensured that constructions regarding sensory protection means for the front zone or area can be related to sensory protection means for the lateral zone or area and vice versa.

A. Sensory Protection Means For the Front Area

Figure 13:
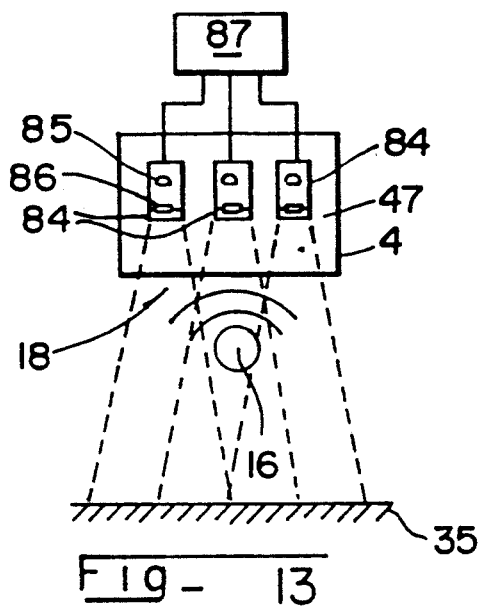
FIG. 13 shows a system for passive, sensory monitoring of the front of the opening member by infrared detectors.

FIG. 13 shows an embodiment of the present invention with sensory monitoring of the danger zone 18 by means of infrared sensors 85. Passive detector means 84 comprising infrared sensors 85 and suitable optics 86 are sensitive to body heat radiation, and are so fitted to the front cover 47 that they can record an approach of limbs. The passive detector means 84 are wired by means of a control device 87, in such a way that they can detect thermal image changes. Thus, they are able to detect the approach or penetration of hands into the danger zone or area 18. As a result of a continuous comparison of the signals of several infrared sensors 85, it is possible to additionally improve the differentiation of signals of the endangered object 16 from those of the surrounding zone or area, such as the floor 35.

Figure 14:
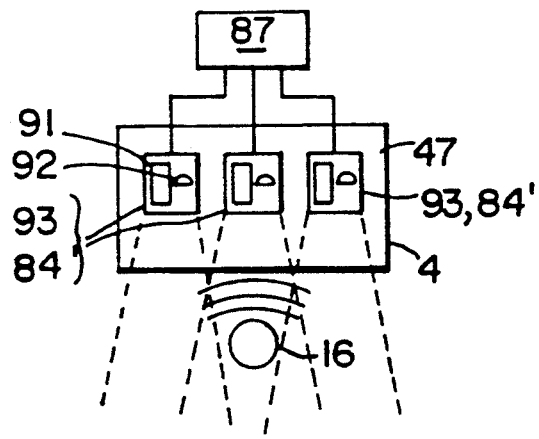
FIG. 14 is a somewhat similar view showing an active, sensory monitoring of the front of the opening member by transmitting and receiving means of an optical nature or based on ultrasonic transducers.

Another embodiment of sensory monitoring will be explained relative to FIG. 14. Monitoring of the danger zone or area can also take place by means of active detector means 93, for example, optical distance or spacing measuring means 84', which comprise a transmitter 91, such as a light emitting diode or a laser, and a receiver 92. The receiver 92 detects the signal emitted by the transmitter 91 after it has interacted with the endangered object 16. Preferably several active detector means 93 are used. By a continuous comparison of their measurements in an evaluating apparatus or control device 87, it is possible to distinguish the reflection signal of the floor 35, which is in any case present with all the receivers, from an additional signal caused by an object 16 and occurring with one or a few detector means 93.

Apart from an optical monitoring of the danger zone or area, it is possible to employ acoustic distance measuring devices 84'. For example, the distance measurement can be determined from the time lag between an emitted ultrasonic pulse and the arrival of its echo.

Figure 15:
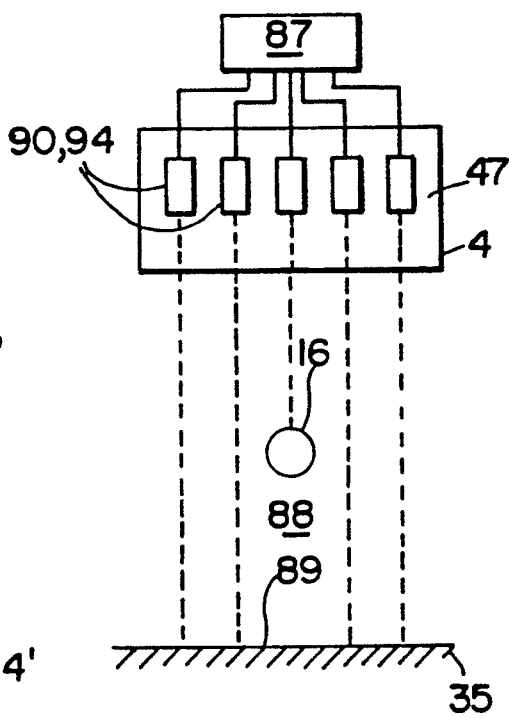
FIG. 15 illustrates a system for sensory monitoring with beam reflection by a floor reflector.

Preferably, a so-called sensory protective curtain is obtained by means of the sensors, as shown in FIG. 15. In the represented embodiment, between the opening member 4 and the floor 35, for example there is placed an optical or acoustic curtain 88 by means of a plurality of detector means 90. If an object 16 is located in the vicinity of the curtain 88, then this is detected by the detector means 90. Either the interruption of the beam is detected (light barrier principle), or in the case of passive sensors the object is directly detected. Active detector means can be, for example, designed as distance measuring devices 94. The function and arrangement of the curtain 88 will be explained hereinafter in conjunction with sensory protective means for the side zones or areas.

In the case of an optical curtain 88 it is possible to provide on the floor 35 a reflecting device 89, for example, in the form of a reflecting strip which reflects back to at least one receiver 92 located at transmitter 91 (like in the arrangement of FIG. 14), the signal of at least one transmitter 91 directed against the reflector means 89 and preferably a light emitting diode or a laser. Optionally receiver 92 is provided with an optics.

Another possibility is for the receiver not to be located at the transmitters 91 and instead, in place of the reflecting means 89, the receivers 92 can be fixed in a row on floor 35 or embedded in the same.

The use of facing optical transmitters 91 and optical receivers 92 is technically more simple, but involves embedding along the bale row 12 a large number of receiver elements within the floor and during the travel of the machine frame 3 along rail 11 it is always necessary to determine which receiver 92 is functioning. Performing the method with the light reflector means 89 only requires the fixing of a good reflecting strip.

In analogy to the optical curtain, it is possible to have an acoustic curtain 88 by means of acoustically active detector means 93 comprising ultrasonic transmitters 91 and ultrasonic receivers 92, the latter being embedded in the floor. It is also possible to receive the ultrasonic signal on the floor following a reflection. The object entering the vicinity of the acoustic curtain 88 and therefore running the risk of entering the danger zone or area 18, is once again recorded by a change to the signal at receiver 92.

All these sensory means are used for initiating protective measures, for example, an active disconnection of the opening roller. Fundamentally the sole protective measure can be constituted by sensory protective means. It is important that the sensor is designed as an active switch, i.e. when the sensor is at OFF (for example, fault in the electronics), the opening roller is also at OFF.

B. Sensory Protection Means for the Lateral Areas

Figure 16:
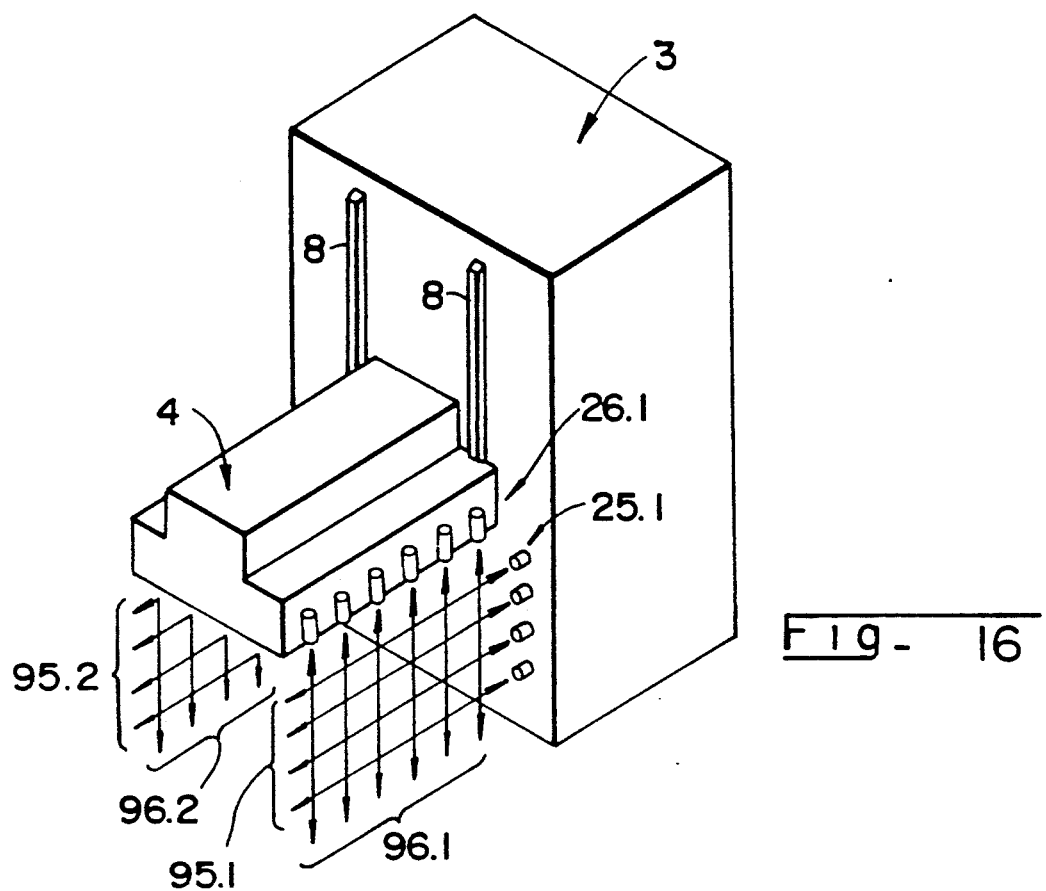
FIG. 16 depicts two possible arrangements of the sensors providing horizontally and vertically oriented protective curtains.

FIG. 16 illustrates the arrangement of the sensors or the curtain by means of two fundamental arrangement principles. On one side of the opening member 4 is arranged a vertical and a horizontal sensor array 2.1, 26.1 and on the other side are corresponding second, not shown sensor arrays. They form vertically oriented protective curtains 96.1 and 96.2 or horizontally protective curtains 35.1 and 35.2. Such vertically or horizontally oriented protective curtains can be combined as in the example according to FIG. 16 or can be used alone. The terms "horizontal" and "vertical" relate to the orientation of the sensors or the axes of their detection cones and not to the protective curtain position. As can be gathered from FIG. 16, in this embodiment both the horizontally oriented curtains 95.1 and 95.2 and the vertically oriented curtains 96.1 and 96.2 run at least approximately parallel to a vertical plane and parallel to the opening member 4. The curtain is formed by the detection cones of several sensors. It must be ensured that the gaps between the cones are smaller than the minimum extension of the objects to be detected. The invention mainly serves to protect people. In this example the curtain is designed in such a way that it is possible to detect the hand or arm of persons entering the danger zone or area. Therefore the gaps must have a maximum size of approximately 10 cm (arm diameter). Thus, the uninterrupted nature of protection is not impaired. It is also possible to design the curtain in such a way that it must detect the entire person. In this case the gaps can be up to, for example, 0 cm. However, then the ratio between the danger zone or area and the monitoring zone or area must be increased. The sensor systems then, for example, detect objects at a distance of 1 to 2 meters from the danger zone or area.

In the case of an inclination of the opening member 4, that is, if the opening process takes place in a plane inclined with respect to the horizontal, there is generally a corresponding adaptation, for example, an inclination of the protective curtains. However, even then, the protective curtains 96.1 and 96.2 are preferably oriented perpendicular or parallel to the opening plane (plane in which the opening rollers process the bales).

Figure 17:
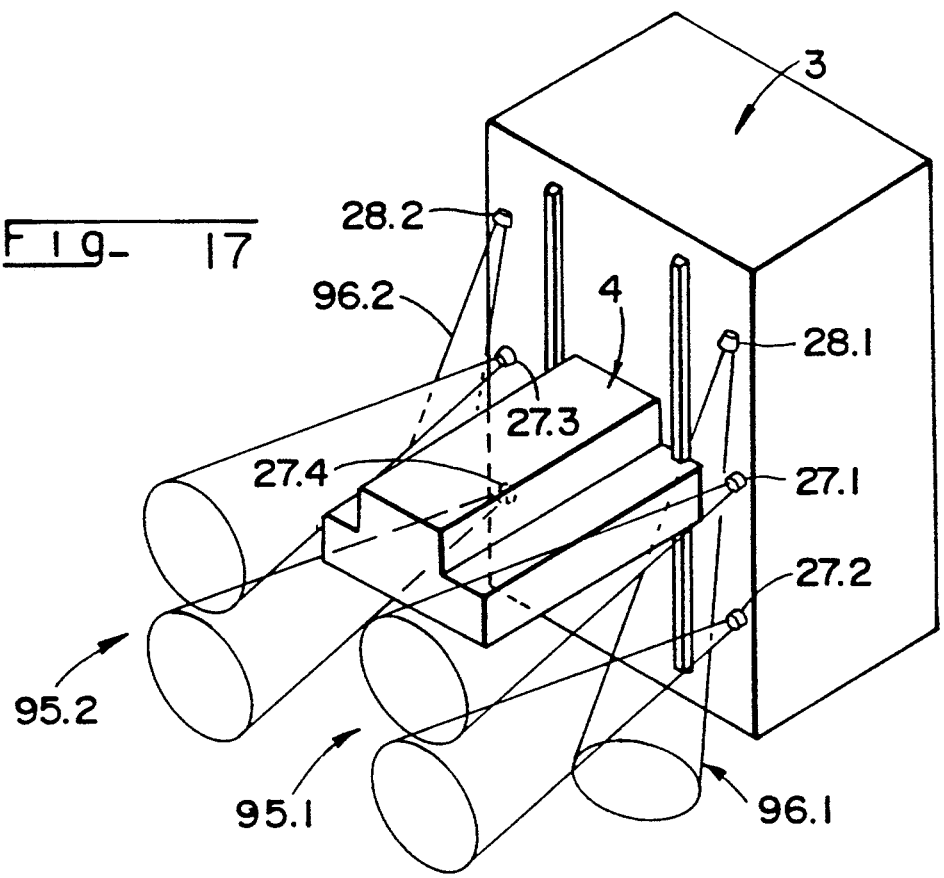
FIG. 17 shows a bale opener with four horizontally positioned and two vertically positioned ultrasonic sensors.

A preferred embodiment of a sensor system with ultrasonic sensors is shown in FIG. 17. Four lower ultrasonic transmitter/receiver means 27.1 to 27.4 fitted to the machine frame 3 and laterally of the opening member 4 form two horizontally oriented protective curtains 95.1 and 95.2. The ultrasonic transmitter/receivers can be constituted by conventional ultrasonic or acoustical transducers, which on detecting an object or a change to the ultrasonic signal supply a corresponding electric output signal, which can be evaluated in a control means. Two vertically oriented protective curtains 96.1 and 96.2 are formed by two further ultrasonic sensors 28.1 and 28.2 fitted to the machine frame 3.

As illustrated by FIG. 17, the ultrasonic transmitters have a certain spread or dispersion. The lateral monitoring zone or area corresponds to the zone or area closed by the spatial extension of the detection cones. If use is made of ultrasonic sensors in which the same transducer is used for the transmitter and the receiver, then a so-called dead zone is located in the near zone in which objects cannot be detected. This fact must in particular be taken into account with respect to the lower sensors 27.1 to 27.4. The two sensors 28.1 and 28.2 arranged over the opening member 4 detect with the vertically oriented curtain such dead zone of the lower sensors 27.1 to 27.4, so that in each case three sensors together uninterruptedly detect the monitoring zones or areas positioned laterally of the opening member 4 in the sense of the invention. The upper sensors 28.1 and 28.2 are positioned by a distance corresponding to their dead zone over the opening member 4 or its top position.

As a function of the specific dimensions and construction of the bale opener, if necessary, the sensors will be arranged in different ways. The arrangement of the sensors is largely determined as a function of the nature and characteristics thereof, as well as their number. It is in particular possible to arrange the sensors on arms 79 fitted to the machine frame 3 according to FIG. 18, instead of directly to said machine frame 3 or the opening member 4. In the case of appropriate characteristics a single sensor can be in each case used for forming a vertically and a horizontally oriented curtain.

Figure 18:
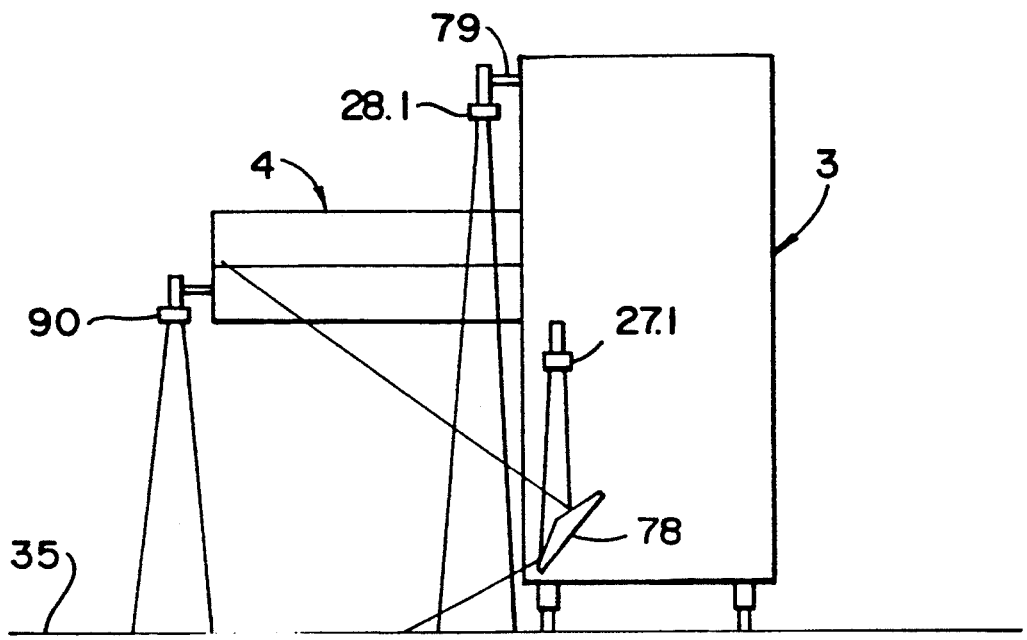
FIG. 18 depicts a bale opener provided with two lateral, vertically oriented, ultrasonic sensors and with ultrasonic sensors for a frontal protective curtain.

FIG. 18 shows such an arrangement possibility in greater detail. A first ultrasonic sensor 27.1 is fitted to the machine frame in such a way that its detection cone is oriented vertically downwards or vertically with respect to the opening plane. A reflector 78 is fitted in the vicinity of the detection cone spaced from sensor 27.1. The reflector 78 is designed in such a way that the beam is divided into two directions. This is achieved in that the reflector 78 is prismatic. A wide dispersion of the cone can be achieved if the reflector, for example, has a convex shape. It is also possible to make the reflector 78 convex in one axis, so as to bring about a maximum extension of the beam in this plane and to make it concave in an axis perpendicular thereto, so as to concentrate the beam in the corresponding plane (saddle shape of surface). This makes it possible to obtain in the lateral direction a narrow and vertically dispersed protective curtain. The reflector 78 is still arranged in the dead zone of the scanning zone or area, so that any contamination of the reflector surface is not detected as interference. The advantage of this arrangement is also that there is no need for a dead zone, such as occurs in the embodiment according to FIG. 17. A second ultrasonic sensor 28.1 is fitted to a support 79 on machine frame 3. This second ultrasonic sensor 28.1 is also vertically oriented and covers the near zone of the machine frame 3, where the detection cone of the first sensor 27.1 is still inadequately dispersed or spread. In this embodiment the sensors are well protected and the beam can be oriented in a simple manner, whilst influencing its spatial extension. An additional protective curtain is frontally formed in this embodiment by several sensors 90, which gives a closed monitoring zone or area for the opening member 4.

Figure 19:
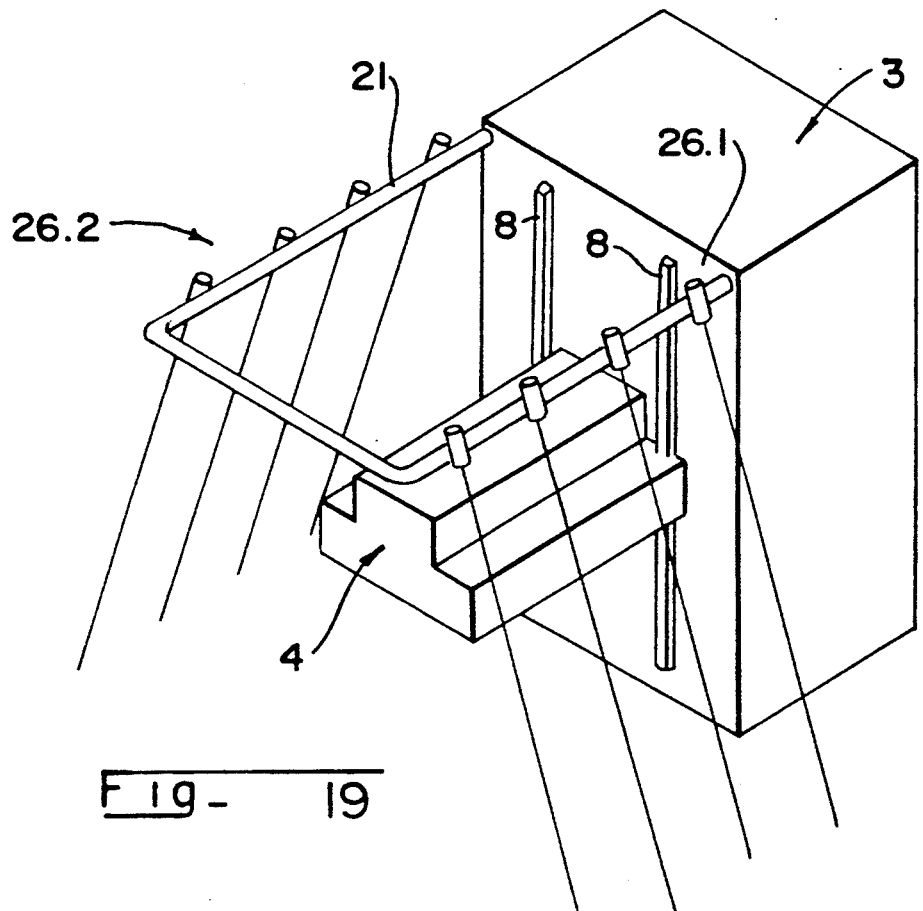
FIG. 19 shows a bale opener with sensor system arranged on a clip or bracket over the opening member.

In order to be able to define a desired, lateral monitoring zone or area in the case of a vertically oriented protective curtain, in the embodiment according to FIG. 19 there is provided a retaining clip or bracket 21 located in a horizontal plane and fixed in the upper region of machine frame 3. It must be borne in mind that although reference is made to a "vertically" or "horizontally" oriented curtain, the sensors need not be oriented vertically or horizontally in the geometrical sense. For specific uses the sensors can also deliberately slope, i.e the protective curtain is not exactly parallel to the opening member 4 and instead forms an angle therewith. In FIG. 19 two sensor arrays 26.1 and 26.2 are arranged on either side of the opening member 4 on the retaining clip or bracket 21 and are oriented so as to slope slightly outward. Each sensor array 26.1 and 26.2 comprises several ultrasonic transmitters/receivers or passive infrared sensors. To facilitate understanding, only the axes of their detection cones are shown. The resulting protective curtain has, in the floor region, the maximum distance from the danger zone or area.

Figure 20:
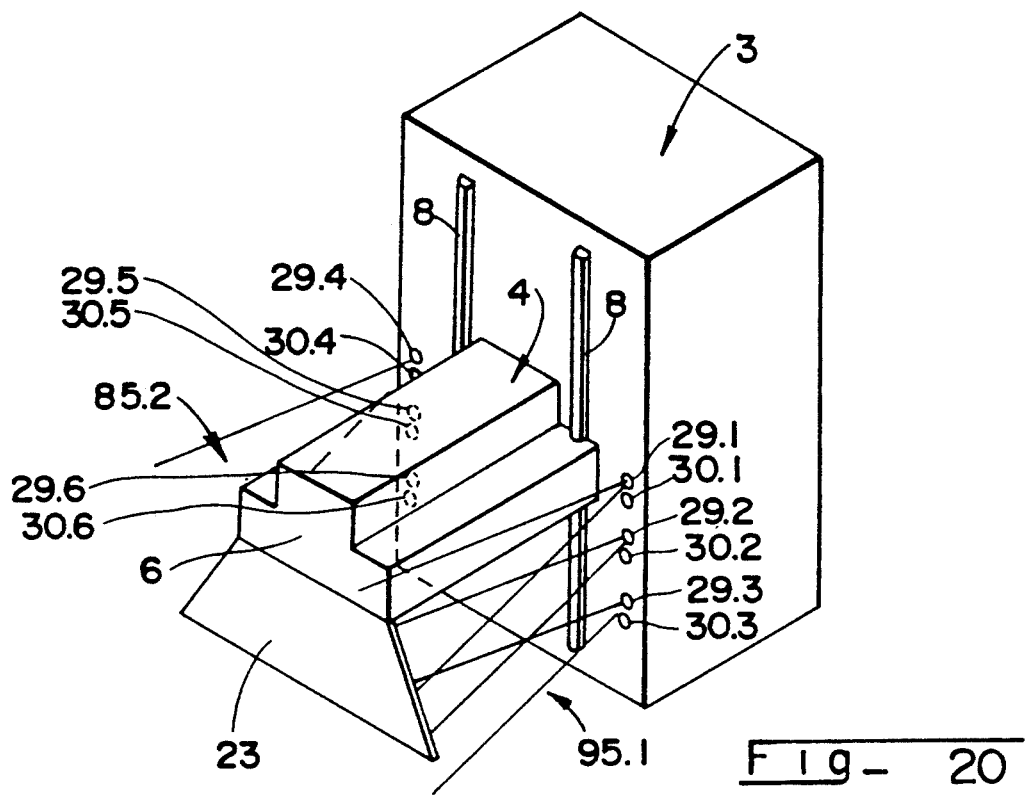
FIG. 20 shows another embodiment in which the bale opener is equipped with horizontally oriented protective curtains and a frontal protective plate.

FIG. 20 shows another embodiment of the invention with two horizontally oriented, optical curtains 95.1 and 95.2. Several active detector means are arranged laterally of the opening member 4 on machine frame 3. The opening member 4 can be moved vertically along the guide rails 8. As a function of the possible height of the bale profile or the desired setting range for the opening member 4 in the vertical direction, the detector means are not restricted to the indicated zone or area and instead extend over a large part or the entire length of the guide rails 8. The detector means are here, for example, reflection light barriers, which comprise in each case one transmitter 29.1 to 29.6, such as a light emitting diode or a laser, as well as corresponding receivers 30.1 to 30.6. A mechanical protective plate 23 is provided here on the front of the opening member 4. The protective plate 23 is wider than the casing or housing 6 and at least partly penetrates the light regions of the transmitters 29.1 to 29.6. Through a continuous comparison of the measurements in the detector means, the reflection signal obtained on protective plate 23 and present at the receivers 30.1 to 30.6 can be distinguished by a signal caused by an object on penetrating the protective curtain.

Figure 21:
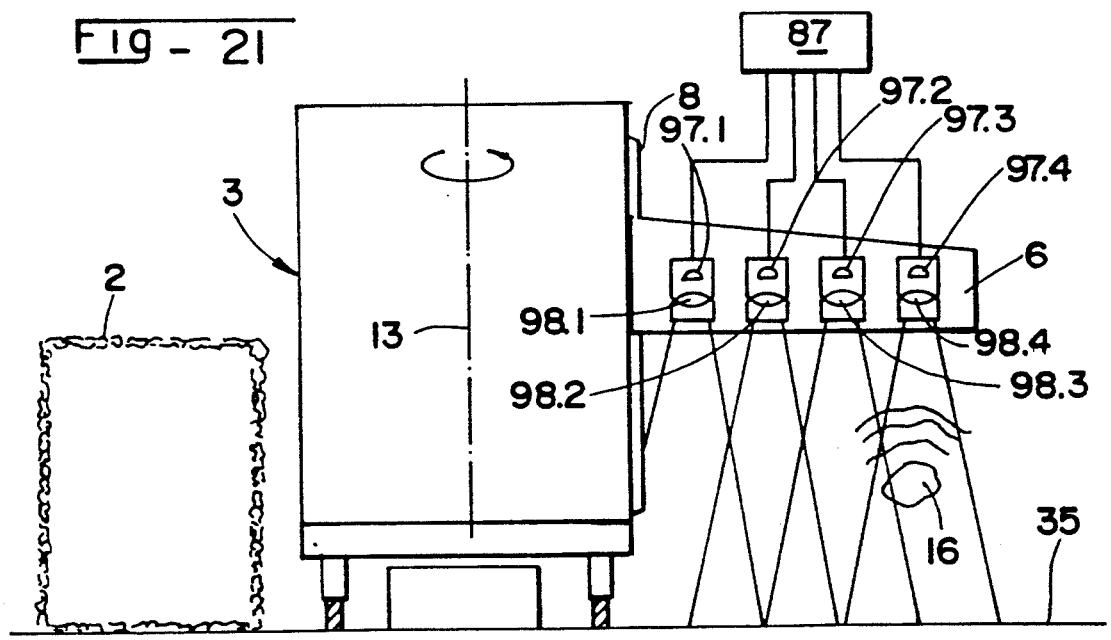
FIG. 21 shows an embodiment having a passive optical sensor system and a vertically oriented protective curtain.

A preferred variant in accordance with the invention provides sensor means which only have one receiver system, for example, image processing systems (CCD array or passive infrared sensors and so forth). FIG. 21 shows an embodiment with infrared sensors arranged laterally of the opening member 4. They form a vertically oriented protective curtain. The infrared sensors 97.1 to 97.4 with associated optics 98.1 to 98.4 sensitive to body heat radiation are fitted laterally to the casing or housing 6. According to a preferred embodiment these infrared sensors are wired by means of a control device 87 in such a way that they can detect changes to the thermal image. Thus, they are able to detect the approach or penetration of hands and other heat radiating objects 16 into the danger zone or area or monitoring zone or area.

An important advantage of sensor systems in accordance with the invention is that the sensor arrays and control unit can be combined with a conventional bale opener as a module. It may be necessary for specific uses to arrange the sensors in vertically adjustable manner. Particularly if the opening member 4 has a large vertical adjustment range, this can ensure that the sensor arrays do not have to be arranged over its entire area and instead the monitoring zones or areas or protective curtains follow the opening member 4. The sensors can either be directly mounted on the opening member 4, or, for example, on vertically adjustable retaining members, which in the same way as the opening member 4 can be moved along the guide rails on the machine frame.

Protective or safety measures can consist of an emergency disconnection of the opening rollers (mechanical or electric brake), the operation of mechanical protection means (covers, drawing the roller into a casing), warning signals and so forth. It must be borne in mind that the protective measures must only be initiated if in fact an object does penetrate the monitoring zone or area. If sensors are used which do not detect the bales (in particular infrared sensors), it is possible to directly detect the penetration of a person into the monitoring zone or area.

During operation, textile bales necessarily enter the lateral monitoring zones or areas. Since, as a function of the sensor used, the textile bales also can be detected, this must be taken into account when triggering the protective measures. No protective measure must be initiated if the sensors receive a signal emitted by bales, i.e. the protective system must behave in a neutral manner with respect to the bales. This can be achieved in that the known bale profile is taken into account when initiating protective measures. Thus, in this way the textile bales are incorporated into the inventive protective concept. For as long as the opening member 4 is located above the bales, there is no danger of a person entering the danger zone or area 18 from the side or below. In the sense of the invention, the bales also form elements of the closed envelope of the danger zone or area.

3. Combination of Mechanical and Sensory Protective Means

Apart from the possibility of using mechanical and sensory protective means alone in each case, the invention also offers the advantage that they can be used in combination. On the one hand, this gives a safety redundancy and, on the other hand, the possibility of simultaneously using the sensor arrays for controlling the mechanical protection means. This is brought about in that the aforementioned operation of the protective plates and so forth is initiated by the sensor arrays.

Their combination also offers advantages due to the possible monitoring of the mechanical (passive) safety part by the sensory (active) safety part. It is also conceivable for the mechanical (passive) safety part to assume an unauthorized state, which is detected by the sensor and at least leads to a disconnection and stoppage of the opening roller.

A good combination is obtained if the mechanical protective means are provided in the close range of the opening rollers and the sensory protective means cover the remaining monitoring zone or area, particularly zones or areas just above the floor. The invention permits a spatial and time-uninterrupted monitoring of the danger zone or area.

4. Self-monitoring

In order to further increase the reliability of the inventive sensor means, preferably there is also a self-monitoring system. Either reference objects or transmitters are introduced into the measuring zone or area of the sensors and/or the transmitter of a sensor is used as a reference signal for the receiver of another sensor.

In the case of an infrared sensor array, for example, a clearly defined reference heating source is provided at an inaccessible part of the bale opener or on the floor. Another possibility consists of igniting a reference heating source at specific test intervals. This can also be arranged in the monitoring zone or area, for example, directly upstream of the sensor. Thus, the movement of a warm object is simulated, so that it is also possible to monitor the response time of the sensor array. Adequate reference objects or transmitters can be correspondingly activated at intervals for other sensors.

Figure 22:
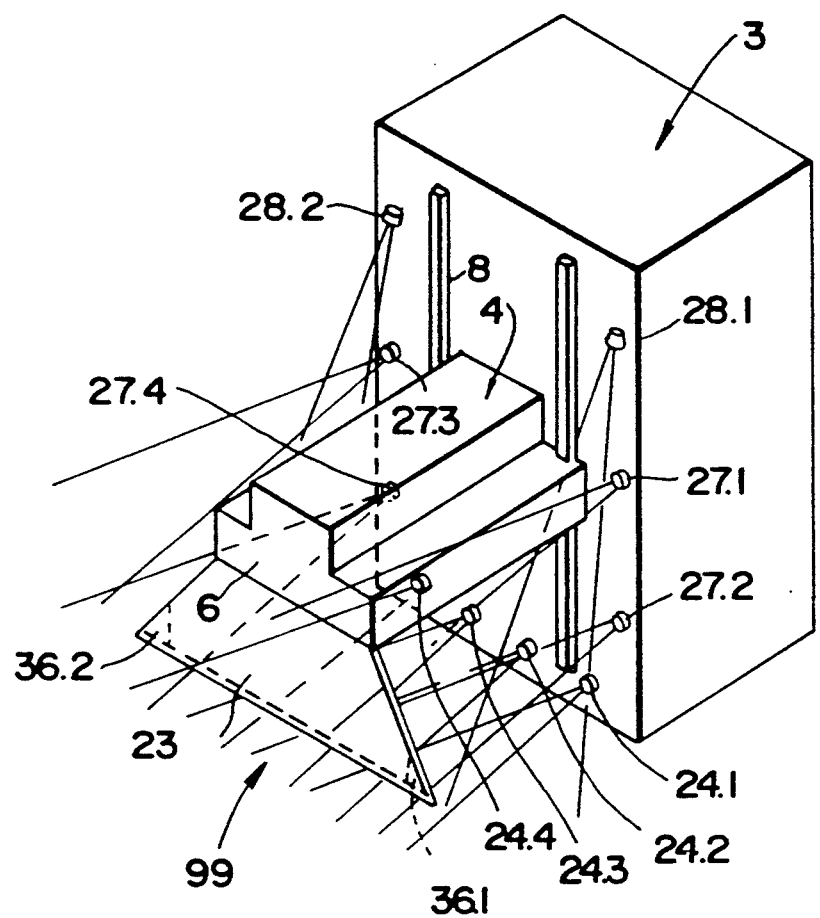
FIG. 22 illustrates an embodiment having a self-monitoring system.
Figure 25:
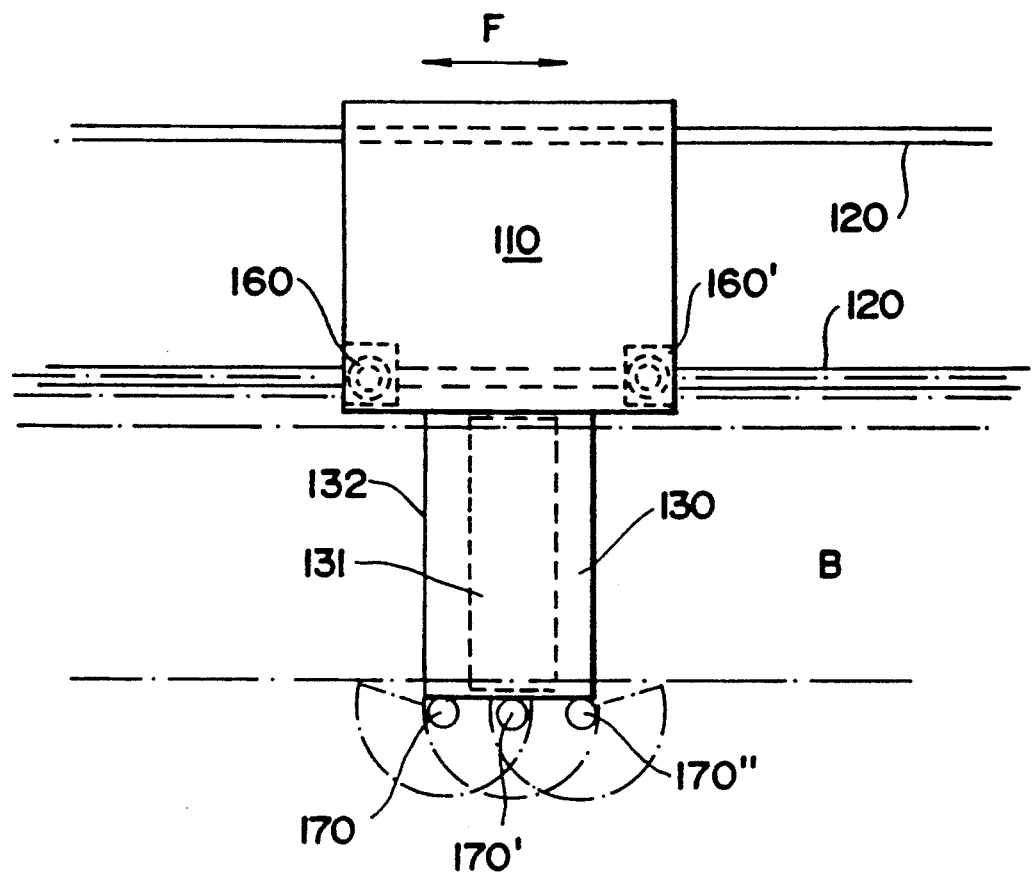
FIG. 25 schematically illustrates in top plan view an exemplary embodiment of the inventive safety or protective apparatus used in conjunction with a bale opening machine.

In the embodiment according to FIG. 22, an ultrasonic sensor array is used, as described relative to FIG. 17. In addition, in this embodiment, a protective plate 23 is provided in the front zone or area. A protective curtain 99 parallel to the opening plane is located between the two lateral protective curtains. The protective curtain is formed by several sensors 24.1 to 24.4 arranged in a horizontal line on machine frame 3. Together with the lateral protective curtains and the front protective plate 23, this protective curtain 99 closes the monitoring zone or area. Thus, nothing can penetrate from the front under and through the protective plate 23 into the danger zone or area beneath the opening rollers.

The arrangement of the elements for the self-monitoring system will be explained by means of this embodiment for two possibilities. It is possible to use the ultrasonic signal of the two upper ultrasonic transmitters/receivers 28.1 and 28.2 as a reference or set value signal for the lower ultrasonic transmitters/receivers and vice versa. The previously mentioned transmitters/receivers 28.1 and 28.2 are controlled in such a way that there is an alternation of the working and test cycles of the upper and lower transmitters. For as long as the corresponding signals are reciprocally received, the readiness to operate of the sensor array is proved. This can be monitored by a corresponding self-monitoring unit. As soon as a signal is no longer received, special measures can be initiated, for example, a disconnection of the bale opening machine, warning signal and so forth. A further possibility consists of fitting to the lateral edge of the protective plate 23 two reference objects 36.1 and 36.2 with good ultrasonic reflection. In certain circumstances the protective plate 23, which extends into the lateral monitoring zone or area, can itself serve as the reference object. It is obviously also possible to provide special reference transmitters in place of reference objects 36.1 and 36.2. In the case of an infrared sensor array, in the same way the reference objects 36.1 and 36.2 can be constituted by two heating sources.

Through using several sensors within a monitoring zone or area, there is a partial overlap of the measuring zones of the individual sensors, that is, there is an active redundancy for certain parts of the monitoring zone or area. This is also utilized for the self-monitoring of the sensor array. If a signal is only received by one sensor in such an zone or area monitored by two or more sensors, this means that there is a fault in the sensor array.

It must be borne in mind that the mechanical and/or sensory protective means can be used not only in the case of horizontally moved bale openers. If the opening member 4 moves along a sloping surface, it must be ensured that the sensor array is so designed that the monitoring zone or area has no dead zones.

FIGS. 23 and 24 respectively schematically depict in top plan view and side view looking at the far side of the bale row facing away from the bale opening machine, a bale opening machine or bale opener 200, illustrating the potential danger zones or areas which are present during opening of, for example, a row of bales B.1 to B.6. The row of bales B.1 to B.6 is arranged along a rail or track structure 120. The bale opening machine 200 is mounted upon this rail or track structure 120 so as to be movable in both movement directions indicated by the double-headed arrow F. The bale opening machine or bale opener 200 comprises a traveling or mobile machine frame 110 and a bale opening member 130 movable at the machine frame 110 in substantially vertical direction. This bale opening member 130 comprises, for example, an opening roller 131 and a casing or housing 132 which covers the opening roller 131 at the top and sides thereof, with such casing or housing 132 thus only being open towards the bottom.

The zone or area having the length l, the width b and the height h constitutes the zone or area through which the opening member 130 can move. The row of bales B.1 to B.6 to be opened, which must be completely placed in this zone or area, constitutes the non-dangerous part of this zone or area, the remaining part of such zone or area is constituted by potential danger zones or areas. Specifically, such potential danger zones or areas are located at the opposite ends of the row of bales B.1 to B.6, in gaps or spaces between given ones of the bales B.1 to B.6, such as the gap or space 220 between the depicted bales B.1 and B.2, and above the row of bales B.1 to B.6, and specifically, constitute potential danger zones of the aforementioned first group. In FIGS. 23 and 24 such first group of potential danger zones or areas, where the access or entry opening of the casing or housing 132 is not covered by the row of bales B.1 to B.6 throughout the entire length of the opening roller 131, have been schematically represented by wide cross-hatching. The aforementioned second group of potential danger zones or areas to both lengthwise sides of the row of bales B.1 to B.6, where the access or entry opening of the casing or housing 132 is partially covered, have been more narrowly cross-hatched in FIG. 23.

As already previously explained, the access opening at the lower region or bottom of the casing or housing 132 is positively covered by the top or upper surface of the row of bales B.1 to B.6 as long as the opening member 130 is located in the bale opening position directly upon the top or upper surface of the row of bales B.1 to B.6, as shown in FIG. 24, and this row of bales B.1 to B.6 has a width which at least exactly corresponds to the length of the opening roller 131. Since the row of bales B.1 to B.6 must be uniformly opened throughout their entire bale width and since it is not possible to exactly position the bales B.1 to B.6, the opening roller or rollers 131, as the case may be, are however, somewhat longer than the maximum width of the row of bales B.1 to B.6. This results in a narrow potential danger zone or area of the aforementioned second group at both lengthwise sides of the row of bales B.1 to B.6, even in the case of bales having the maximum possible bale width. These potential danger zones or areas at the lengthwise or lateral sides of the row of bales B.1 to B.6 increase in size at those regions where there are present bales of lesser width, such as the bales B.2 and B. depicted in FIG. 23. In other words, along both of the lengthwise sides of the row of bales B.1 to B.6 there are accessible at the opposite ends of the opening roller 131, from below or from below at an inclination, smaller or larger regions of such opening roller 131, and these accessible regions of such opening roller 131 constitute potential danger zones or areas.

It also will be understood that if the opening member 130 is not directly located at the top or upper surface of the row of bales B.1 to B.6, that is, not in an actual bale opening position, rather at a spacing above such top or upper surface of the row of bales B.1 to B.6, or at the location of a gap or space within the row of bales B.1 to B.6, as indicated, for instance, by the gap or space 220 between the bales B.1 and B.2 shown in FIG. 24, or is located remote from the ends of the row of bales B.1 to B.6, then the opening roller 131 is not covered throughout its entire length and is readily accessible, so that in this case there arise potential danger zones or areas of the aforementioned first group.

The employed safety apparatus or equipment therefore must be constructed such that each employed opening roller 131 is completely covered in the zone or area 1.b.h., does not rotate or, however, is located in a protected zone or area or region where access thereto is not possible, or which responds to such access by eliminating the danger, such as stopping rotation of the opening roller 131 or the bale opening machine 200. To that end, the safety apparatus or equipment of the present development comprises partial safety or protective devices, wherein one partial safety device ensures for protection in potential danger zones or areas of the first group, and two other partial safety devices ensure for protection in potential danger zones or areas of the second group at a respective lengthwise side of the row of bales B.1 to B.6. Each of the partial safety devices advantageously comprises a transducer, and preferably an electro-acoustical transducer or a group of electro-acoustical transducers and associated control unit or device.

At the lengthwise side of the row of bales B.1 to B.6 confronting the machine frame 110 the potential danger zones or areas of the second group, just passed through by the opening member 130, are fenced or screened off by safety barriers or fences 11 and 11' movable in conjunction with the machine frame 110 and provided at both sides of such machine frame 110 in a direction substantially parallel to the lengthwise sides of the row of bales B.1 to B.6. These safety barriers or fences 11 and 11' monitor access to the lengthwise sides of the row of bales B.1 to B.6 throughout a predetermined path or distance before and after the machine frame 110.

The safety barriers or fences 11 and 11' co-moved with the machine frame 110 have two functions, namely, initiating a reaction at the bale opening machine 200 upon unwanted intrusion into the fenced off zone or area and recognizing objects which protrude quasi-stationarily from this side toward the lengthwise side of the row of bales B.1 to B.6, and also in this case, to initiate a machine reaction.

Since the safety barriers or fences 11 and 11' are located in the spaces or regions required by the machine frame 110 for its movement, these safety barriers or fences 11 and 11' are located externally of every possibly encountered row of bales, and thus, need not be accommodated to the exact shape of the row of bales and controlled as a function thereof. Only when the machine frame 110 is located at the region of the ends of the row of bales B.1 to B.6, is it possible for the safety barriers or fences 11 and 11' to extend beyond the movement region of the machine frame 110. Therefore, at such locations there must be available correspondingly more empty space, or else the safety barriers or fences at these locations must be shortened.

The safety barriers or fences 11 and 11' can continuously extend in height and can cover the entire region of movement of the opening member 130 in vertical direction. These safety barriers or fences 11 and 11' also can be constructed as line-like or linear barriers or fences distributed throughout the height through which moves the opening member 130 in vertical direction, or even can consist of a single such barrier or fence provided at a lower region of the opening member 130 or the bale opening machine 200. These safety barriers or fences 11 and 11' are to be positioned as closely as possible to the lengthwise side of the row of bales B.1 to B.6, since only in that case is there increased the probability that there will be detected quasi-stationary objects at the lateral potential danger zones or areas and there thus afforded adequate security. The expanse of such safety barriers or fences in the direction of movement of the bale opening machine 200 is to be chosen such that a human being cannot reach with any limb or extremity or with an object held in his or her hand around the safety barrier into the actual danger zone or area beneath the opening roller 131 without passing, with some part of his or her body, through the safety barriers or fences 11 and 11.

It is here further remarked with reference to FIG. 23, that potential danger zones or areas at the lengthwise side of the row of bales B.1 to B.6 located opposite to or facing away from the machine frame 110, are fenced off or shielded by a safety barrier or fence 12. This safety barrier or fence 12 is arranged substantially parallel to the neighboring lengthwise side of the row of bales B.1 to B.6 and extends from the end or front face 134 of the opening member 130 to both sides thereof in the direction of movement F of the bale opening machine 200 and downwardly. This safety barrier or fence 12 can be mechanical in construction, as for example previously considered, and prevents dangerous intrusions, or can comprise a sensor structure which detects such intrusion and appropriately stops the movement or rotation of each opening roller 131.

This safety barrier or fence 12 moves in conjunction with the opening member 130 and at all times is situated externally of every possibly encountered row of bales, so that it need not be accommodated to the geometry or profile of the different row of bales undergoing opening by the bale opening machine 200. Just as was the case for the safety barriers or fences 11 and 11', the safety barrier or fence 12 should be situated as close as possible to the associated lengthwise side of the row of bales and that its extension or expanse in downward direction and laterally should be such that a human being cannot enter with any body extremity, such as a hand or leg, and also not with an object held in his or her hand, through the safety barrier or fence 12 into the actual danger zone or area.

At this juncture there will be shortly considered with reference to FIGS. 2 to 32 preferred embodiments of the safety means or facilities for establishing a safety barrier or fence at the lengthwise side of the row of bales, like the row of bales B.1 to B.6, facing or confronting the machine frame, like the machine frame 110.

It is to be observed, however, that safety barriers or fences for the lengthwise side of a row of bales, like the row of bales B.1 to B.6, which faces away from the machine frame 110, will be considered in conjunction with FIGS. 2, 26, 33 and 34.

Safety barriers or fences, like the safety barriers or fences 10 and 10' depicted in FIG. 23, which extend substantially parallel to the axis of rotation of the opening roller 131, will be considered in conjunction with FIGS. 3, 36, 37 and 38.

These safety barriers or fences 10 and 10' depicted in FIG. 23, which extend substantially parallel to the axis of rotation of the opening roller 131, must be controlled in such a manner that they are active in potential danger zones or areas of the first group, namely, access throughout the entire length of the opening roller 131, otherwise such safety barriers or fences 10 and 10' are passive. Monitoring means or devices are known which monitor the position of the opening roller or rollers relative to the top or upper surface of a row of bales. In this regard, there can be used sensors mounted, for example, at the opening roller casing or housing, which form parallel to the opening roller or rollers, advantageously at opposite sides thereof, a respective barrier or fence, for example, a light barrier. As long as both light barriers are interrupted, the opening member is located, in bale opening position, directly upon the top surface of a bale of the row of bales being opened. On the other hand, when one of the light barriers is not interrupted then the opening member is located in a potential danger zone or area of the aforementioned first group, that is to say, the lower opening of the opening roller casing or housing is not, or only partially, covered by a bale top surface, and thus, presents a dangerous situation, so that an appropriate safety apparatus, for example, safety barriers disposed parallel to the rotational axis of the opening roller must be switched into their active mode. Suitable feeler cams or dogs 153 (see FIG. 23) marking the ends of the row of bales and gaps between bales can be beneficially used for the control of the safety barriers or fences extending parallel to the rotational axis of the opening roller or rollers. These feeler cams or dogs 153 can be mounted at suitable locations of the rail or track structure 120 and their position can be detected by an appropriate feeler or sensor provided at the machine frame 110.

Every part of the inventive safety apparatus or equipment can be realized autonomous and independent of the machine control. Appropriately combined parts provide a safety apparatus which detects potential danger zones or areas of the first group, which extend throughout the entire length of the opening roller 131, and respond thereto in such a manner that as a result there is not present any actual danger. Equally, such safety apparatus prevents access or entry into potential danger zones or areas of the second group which only affect parts of the opening roller 131, or in the event of such an access or entry appropriately eliminate any actual danger. Furthermore, such safety apparatus detects quasi-stationary foreign objects in potential danger zones or areas if such protrude laterally of the row of bales B.1 to B.6 or protrude upwardly beyond the top surface of the row of bales B.1 to B.6 and respond thereto before the corresponding location becomes an actual danger zone or area.

All of the safety apparatuses to be considered with reference to FIGS. 2 to 38 comprise appropriate transducers, and here, advantageously, electro-acoustical transducers, for example, ultrasound or ultrasonic transducers and are conceived to carry out a self-monitoring or self-checking operation. Appropriate transducers, the arrangement and function of which in conjunction with an appropriate control unit and serving as monitoring sensors having a self-checking function, although for a different use, are known from the commonly assigned German Published Patent Application No. 3,932,665 and the cognate European Published Patent Application No. 419,833, published Apr. 3 1991 the disclosure of which is incorporated herein in its entirety by reference, and thus, the function thereof need not be here further described in detail.

It is here also noted that a particularly advantageous and preferred construction of transducer is commercially available from the well known German company, Siemens AG., and is disclosed in their product literature, dated 1989, under Order No. GWA 4NEB 839 0476-10a. Such transducer is referred to therein as a sonar sensor or ultrasonic distance sensor.

Continuing, it is further remarked that since a great deal of dust is formed during operation of the bale opening machine and during handling of the bales, and moreover, upon the floor of the bale opening room there usually is also present a large number of fiber flocks in various size flock accumulations, it is advantageous to arrange the employed electro-acoustical transducer or transducers in a relatively closed space or compartment and to not use the floor as a reference reflector. It is for this reason that for this field of application, the electro-acoustical transducer is positioned in an acoustical or sonic chute and advantageously has an upwardly directed primary or main transmitter direction, and the upper wall of such acoustical or sonic chute serves as a reference reflector. Such reference reflector, by virtue of being enclosed and because of its downwardly directed position, remains extensively free of contamination and provides a constant reference measurement. Furthermore, the spacing of this reference reflector from the electro-acoustical transducer can be realized in a very simple manner. It is possible to vary the distance between the reference reflector and the associated electro-acoustical transducer in any suitable manner, for instance, by displacing the upper wall or any other support at which such reference reflector is mounted.

Figure 26:
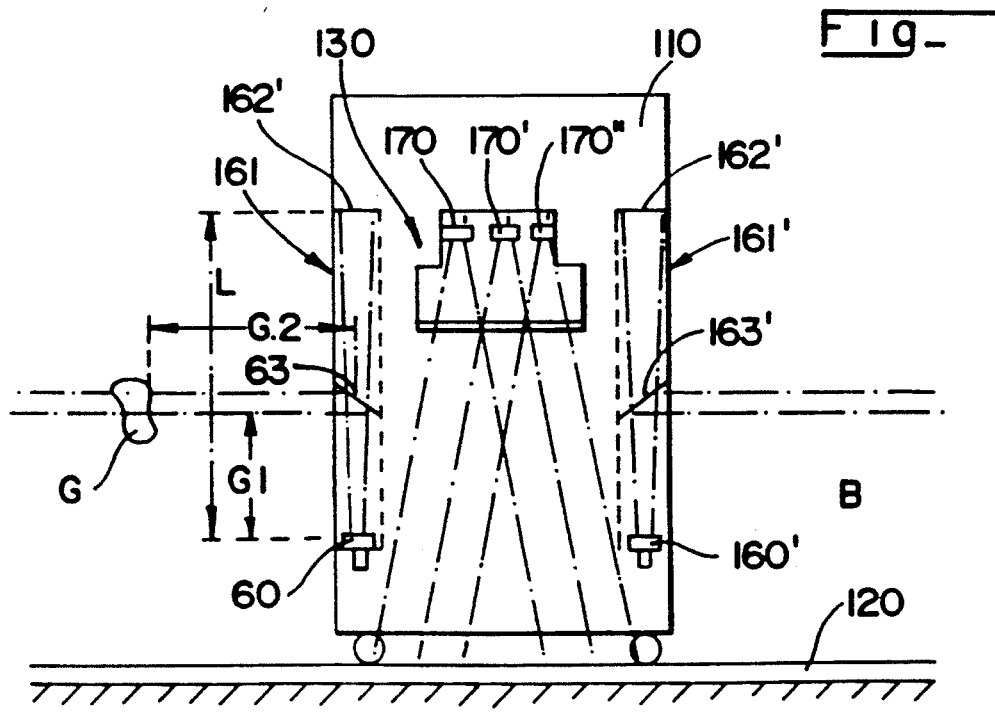
FIG. 26 schematically illustrates in side view the exemplary embodiment of safety or protective apparatus used in conjunction with a bale opening machine as depicted in FIG. 25.

Turning attention now to FIGS. 2 and 26, there is depicted therein in respective top plan view and side view looking from the far side of the bale row facing away from the machine frame 110, an embodiment of sensors or sensor means by means of which there can be produced safety barriers or fences or electronic shields which extend substantially parallel to the lengthwise sides of the row of bales, like the previously considered row of bales B.1 to B.6, but here simply designed by reference character B. In such FIGS. 2 and 26 there is again depicted the bale opening machine 200 which moves back and forth upon the rail or track structure 120 in both travel directions F past the row of bales B. There also has been shown the machine frame 110 and the bale opening member 130 and its bale opening roller 131.

Within the machine frame 110 there is arranged at opposite ends or sides thereof, as seen in FIG. 2, and at the lower region, a respective electro-acoustical transducer 160 and 160' and an associated acoustical or sonic chute 161 and 161', respectively, in such a manner that the directional beam is transmitted by the corresponding electro-acoustical transducer 160 and 160' essentially vertically upwardly within the associated acoustical or sonic chute 161 and 161', respectively Both of the acoustical or sonic chutes 161 and 161' and both of the electro-acoustical transducers 160 and 160' are arranged as close as possible at the side of the machine frame 110 confronting the row of bales B. In the primary or main transmission direction of each such electro-acoustical transducer 160 and 160' there is arranged in spaced relationship at the distance or spacing L therefrom and substantially perpendicular to the primary transmission direction, a respective reference reflector 162 and 162'. Furthermore, there is arranged in the primary or main transmission direction of each such electro-acoustical transducer 160 and 160' in spaced relationship at the distance or spacing G.1<L therefrom and at an angle of about 4° with respect to the primary transmission direction, a respective deflection reflector 163 and 163' which deflects part of the associated directional or bundled beam in a direction out of the machine frame 110. This deflection direction is essentially horizontal and parallel to the direction of movement of the bale opening machine 200. At the height of each such deflection reflector 163 and 163' the associated acoustical or sonic chute 161 and 161' is provided with a suitable exit or outlet opening for the corresponding deflected directional beam.

A respective acoustical or ultrasonic signal reflected at the associated reference reflector 162 and 162', following transmission by the associated electro-acoustical transducer 160 and 160', respectively, after a time corresponding to the length L, is again received by such associated electro-acoustical transducer 160 and 160' and serves as a self-checking or self-control signal for monitoring the operation of the related sensor arrangement. Each such reflected signal can be evaluated in the following manner as a reference signal. The part of the corresponding directional beam deflected by the respective associated deflection reflector 163 and 163' is reflected by, for instance, an object G arranged externally of the machine frame 110. These reflected signals are received by the related electro-acoustical transducer 160 and 160' after a certain transit time, corresponding to the distance G.1 plus the distance G.2 of the object from the respective associated deflection reflector 163 and 163'. The spacing or distance L is selected such that it is equal to the sum of the distances G.1 and G.2 for an object which is spaced at such a distance from the machine frame 110 that it just no longer must be detected. Signals received by the relevant electro-acoustical transducer, like the electro-acoustical transducer 160, after a time corresponding to the distance L, are evaluated in a suitable electronic control device or control means 210 as control signals for the self-checking or self-monitoring of the safety apparatus or system. If, after this time, there are not received any signals, such signifies a defect in the safety apparatus, and there is shutdown, for instance, the opening roller 131 and the bale opening machine 200. Signals which are received after a short amount of time, are evaluated as alarm or warning signals indicative of the presence of a foreign or unwanted object at the vicinity of the opening member 130, likewise resulting in shutdown of the opening roller 131 and the bale opening machine 200. Signals which are received after a longer amount of time than the time corresponding to the distance or spacing L, are ignored. Furthermore, the electronic control means 210 can advantageously serve for activating only the electro-acoustical transducer or transducers which are effective for that direction of movement through which momentarily travels the bale opening machine 200. Such electronic control means 210 also can control operation of drive means 212 for driving the bale opening machine 200 such that upon occurrence of a predetermined recognition or detection signal there is selectively accomplished an interruption or movement reversal of the bale opening machine. While the electronic control means 210 and bale opener drive means 212 has been specifically shown in FIGS. 25 and 26, it should be understood such structure is equally provided for the other depicted embodiments, but has been conveniently omitted to simplify the illustration.

In order to be able to set the range of such type of safety apparatus, each reference reflector 162 and 162' can be mounted at an adjustable spacing or distance from the associated electro-acoustical transducer 160 and 160' in the corresponding acoustical or sonic chute 161 and 161' respectively. As a result, there can be set or adjusted the length L and thus the range of the monitoring operation. Of course, the same effect can be realized by means of software.

Variant constructions are possible using two or more deflection reflectors, like, for instance, the deflection reflectors 163 and 163' which split the corresponding directional beam into a control section and a number of superimposed horizontal measuring or measurement sections. Furthermore, modifications are conceivable in which the electro-acoustical transducer is arranged to have an essentially vertically downwardly directed primary transmission direction. In this instance, the floor 104 serves as reference reflector. However, the embodiment having an upwardly directed primary or main transmission direction of the electro-acoustical transducer and associated acoustic or sonic chute is preferable, since in the bale opening room the floor of such room frequently is covered with fiber flocks which could falsify the control or checking signal and thus the distance L only can be pre-set within very narrow limits.

FIGS. 2 and 26 also depict an exemplary embodiment of safety means or safety apparatus for forming a safety barrier or fence at the lengthwise side of the row of bales B situated remote from or facing away from the machine frame 110. Here, it will be seen there is provided an arrangement of, for example, three synchronized electro-acoustical transducers 170, 170' and 170". These three synchronized electro-acoustical transducers 170, 170' and 170" are arranged at the end or front face 134 of the casing or housing 132 of the opening member 130 in such a manner that the primary transmission direction of each such electro-acoustical transducer 170, 170' and 170" is directed essentially vertically downward and that the spacing or distance to the floor 104 is the same for each such electro-acoustical transducer. These three synchronized electro-acoustical transducers 170, 170' and 170" are arranged as high as possible at the casing or housing 132, so that their effective detection region in the zone or area of the actual danger is sufficiently large directly beneath the opening roller 131 in the direction of movement F of the bale opening machine 200 in order to prevent unwanted access to the opening roller 131.

The self-checking of the arrangement composed of the electro-acoustical transducers 170, 170' and 170" consists in receiving the signals reflected by the floor 104, which must be simultaneously received within a predeterminable tolerance band governed by the soiling or contamination of the floor. Signals not simultaneously received by the three synchronized electro-acoustical transducers 170, 170' and 170" are assessed as a defect in the safety apparatus or the presence of a foreign object in the monitored area or region.

FIGS. 27, 28 and 29 illustrate detail sectional views through one of the apparatuses or devices for producing a sensor-type safety barrier or fence laterally of the machine frame 110, as such has been previously illustrated and considered with respect to FIGS. 2 and 26. The entire depicted safety apparatus comprises an acoustical or sonic chute 161 having a lower opening or port 164 and a lateral opening or port 16, an electro-acoustical transducer 160 arranged in the lower opening or port 164, a reference reflector 162 arranged opposite to the lower opening or port 164, and a deflection reflector 163 arranged at the height of the lateral opening or port 16. The entire safety apparatus is arranged within the machine frame 110. One notable advantage of this internally enclosed safety apparatus resides in the extensive protection accorded the electro-acoustical transducer 160 and the reference reflector 162 against contamination by fibers and dust.

FIGS. 30, 31 and 32 depict in illustrations analogous to FIGS. 27, 28 and 30, respectively, a safety apparatus arranged laterally at the machine frame 110 and which embodies two electro-acoustical transducers 160.1 and 160.2 provided for respective acoustical or sonic chutes 161.1 and 161.2. It will be understood the electro-acoustical transducer 160.1 produces a safety barrier or fence extending substantially parallel to the direction of movement F of the bale opening machine 200, whereas the other electro-acoustical transducer 160.2 produces a safety barrier or fence extending substantially perpendicular to such direction of movement F of the bale opening machine 200. Since the safety barriers or fences extending substantially perpendicular to the direction of movement F of the bale opening machine 200 extend at the region of the row of bales B and thus also into the gaps or spaces, like the gap or space 220 shown in FIG. 23, between given ones of the bales of the row of bales B, but, however, are unable to distinguish between bales and foreign bodies, these safety barriers or fences must be active at the locations of the bale gaps or spaces and at the opposite ends of the row of bales B, whereas in all other instances such safety barriers or fences must be switched into their passive operational mode. For this purpose and as previously explained with regard to the discussion of FIG. 23, feeler cams or dogs 153 marking the ends of the row of bales and the gaps or spaces between the bales can be beneficially used for the on-off control of the safety barriers or fences extending parallel to the rotational axis of the opening roller or rollers.

Figure 33:
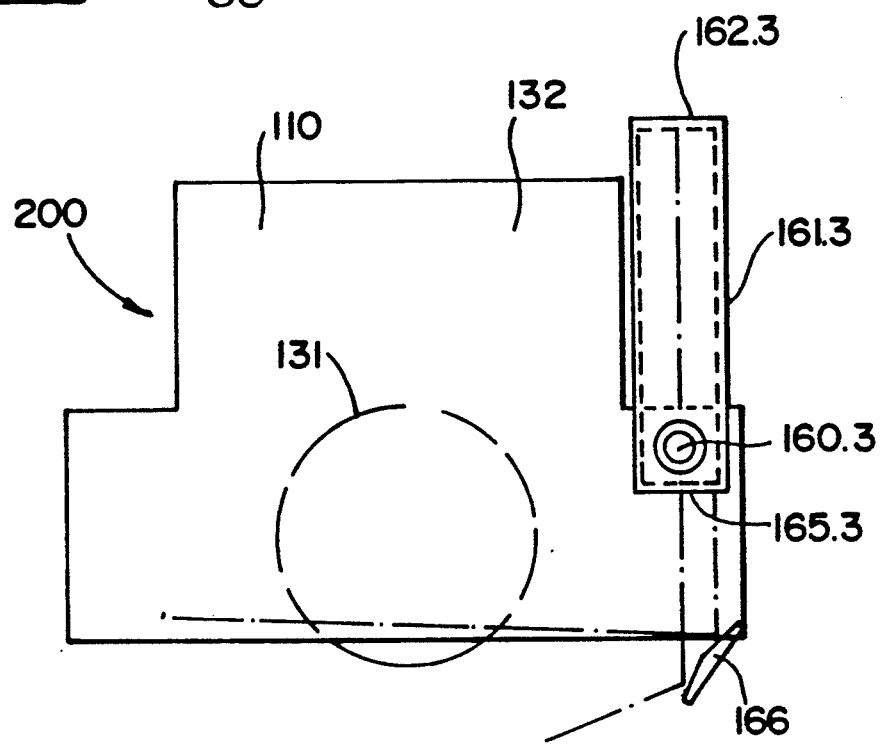
FIG. 33 schematically illustrates a further embodiment of a safety apparatus containing sensor means for creating a safety or protective barrier or fence or shield at the lengthwise side of the row of bales facing away from the machine frame, viewed in a direction substantially perpendicular to the direction of movement of the bale opening machine.
Figure 34:
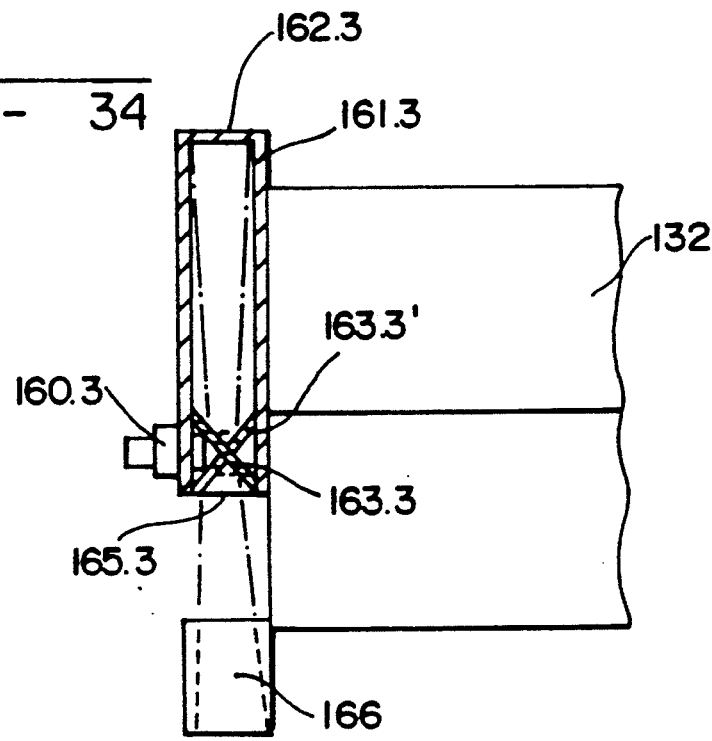
FIG. 34 schematically illustrates the safety apparatus of FIG. 33, viewed in a direction substantially parallel to the direction of movement of the bale opening machine.
Figure 35:
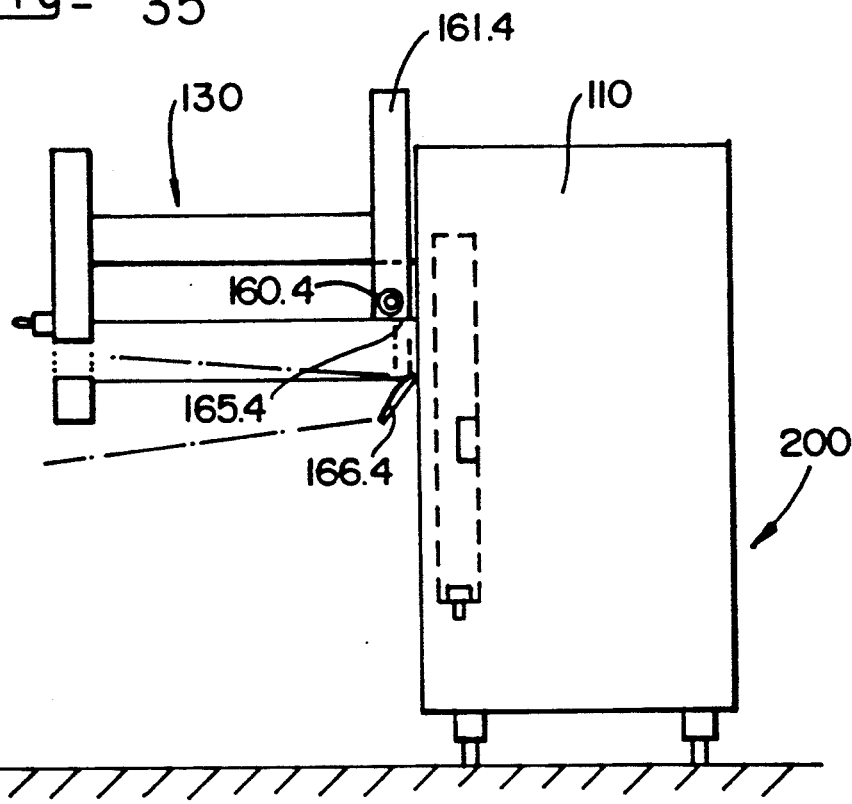
FIG. 35 schematically illustrates a further embodiment of safety or protective apparatus containing sensor means for creating a safety barrier or fence or shield substantially perpendicular to the direction of movement of the bale opening machine, as viewed in a direction substantially parallel to the direction of movement of the bale opening machine.

FIGS. 33 and 34 depict a further exemplary embodiment of sensors or sensor means having a self-checking or self-monitoring operational mode, which serve to produce a safety barrier or fence extending substantially parallel to the lengthwise side of the row of bales B at the side of such row of bales which is located remote from or faces away from the machine frame 110. In this arrangement there is only used a single electro-acoustical transducer 160.3 and a related acoustical or sonic chute 161.3, so that in contrast to the arrangement previously described with reference to FIGS. 2 and 26, here the floor of the bale opening room is used as reference reflector or reflection means. The acoustical or sonic chute 161.3 is positioned substantially upright or vertically at the front side of the casing or housing 132 of the opening roller 131 and is provided at its lower region with a lateral opening or port 164.3 for the electro-acoustical transducer 160.3 and a lower exit or outlet opening or port 16.3. At the height of the electro-acoustical transducer 160.3 there are arranged within the acoustical or sonic chute 161.3 two deflection reflectors 163.3 and 163.3' in cross-wise fashion in adjacent relationship to one another such that the deflection reflector 163.3 upwardly deflects part of the directional beam towards a reference reflector 162.3, whereas the other deflection reflector 163.3' downwardly deflects another part of the directional beam through the lower exit or outlet opening or port 16.3. Externally of this lower exit or outlet opening or port 16.3 there is arranged a further deflection reflector 166 which is constructed and arranged such that the directional beam is deflected and fanned apart or dispersed in a direction extending substantially parallel to the direction of movement F of the bale opening machine 200. As a result, it is possible to positively fence off the danger zone or area at the side of the row of bales B facing away from the machine frame 110 with only one electro-acoustical transducer 160.3.

Figure 36:
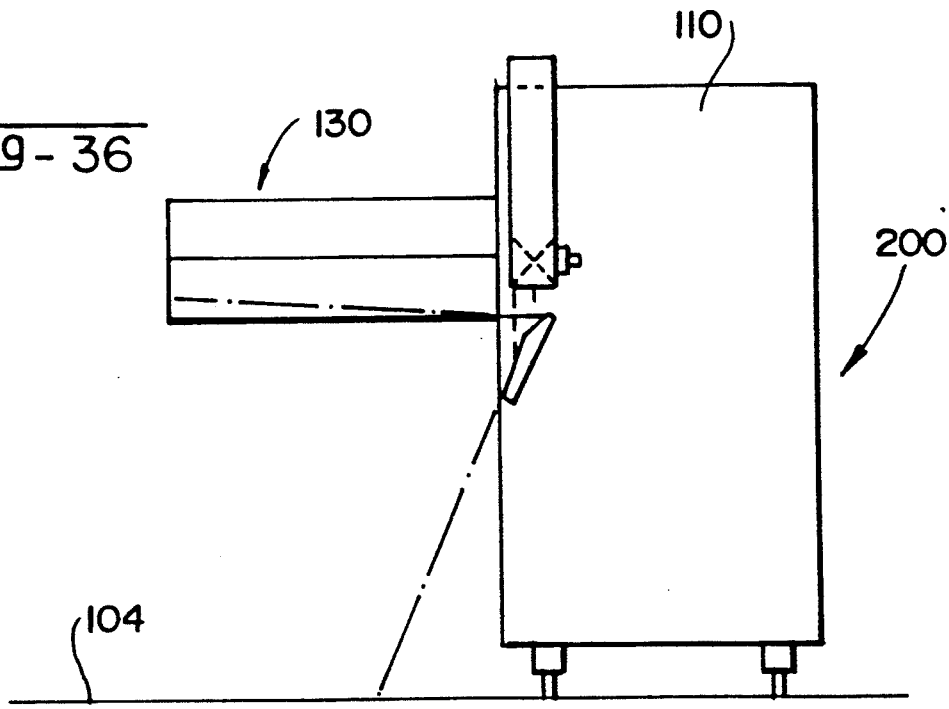
FIG. 36 schematically illustrates yet a further embodiment of safety apparatus containing sensor means for creating a safety barrier or fence or shield substantially perpendicular to the direction of movement of the bale opening machine, as viewed in a direction substantially parallel to the direction of movement of the bale opening machine.

FIGS. 3 and 36 depict two respective embodiments of sensors or sensor means for producing a safety barrier or fence which extends substantially perpendicular to the direction of movement F (see FIG. 23) of the bale opening machine 200. Each of the views depicted in such FIGS. 3 and 36 are portrayed looking in a direction parallel to such direction of movement F of the bale opening machine 200. In both of these embodiments there are used electro-acoustical transducers.

With particular attention first directed to the embodiment of FIG. 3, there is shown an acoustical or sonic chute 161.4 provided with an electro-acoustical transducer 160.4. This acoustical or sonic chute 161.4 is secured at the bale opening member 130 in upright position at the region of its end face confronting the machine frame 110, as considered previously in conjunction with the embodiment discussed with reference to FIGS. 33 and 34. Externally of the lower exit or outlet opening or port 16.4 there is arranged a deflection reflector 166.4 which is constructed and arranged such that the directional beam transmitted thorough this lower exit or outlet opening or port 16.4 is deflected and fanned apart or dispersed in a direction extending substantially perpendicular to the direction of movement F (see FIG. 23) of the bale opening machine 200, so that there is formed laterally of the bale opening member 130 a safety barrier or fence.

FIG. 36 illustrates a quite similar arrangement which, however, is here arranged at the machine frame 110 and produces an even more intensively fanned or spread apart directional beam.

For both embodiments of FIGS. 3 and 36, there is again applicable for the depicted arrangements what has been previously disclosed regarding safety barriers or fences extending substantially perpendicular to the direction of movement F of the bale opening machine 200, namely, that they must be controlled in dependence upon the shape of the gaps or spaces between the bales of the bale row, since the safety apparatus is incapable of distinguishing between the presence of bales and foreign objects.

FIGS. 37 and 38 respectively depict in a direction extending substantially parallel to the direction of movement F of the bale opening machine 200 and in top plan view, an embodiment of sensors or sensor means which detect foreign bodies protruding above the top surface of the bales B and access to the opening roller 131 from the side of the bale opening member 130. Also here, there can be used for accomplishing such functions electro-acoustical transducers and associated acoustical or sonic chutes and reflectors in correspondence with the exemplary embodiments previously described with reference to FIGS. 33 to 36. As specifically shown for the arrangement depicted in FIGS. 37 and 38, there can be provided, for example, an acoustical or sonic chute 161. equipped with an electro-acoustical transducer 160. and positioned in the manner previously considered with regard to FIG. 3. The part of the directional beam transmitted thorough the lower exit or outlet opening of the acoustical or sonic chute 161. is deflected by means of a further deflection reflector 166. above the top or upper surface of the row of bales B in a direction extending substantially perpendicular to the direction of movement F of the bale opening machine 200 and is then fanned apart or dispersed and enlarged in a surface-like or areal fashion by means of a final deflection reflector 167 above the top or upper surface of the row of bales B.

Furthermore, it is here pointed out that the possibility exists of using the monitoring sensor having a self-checking function as employed for the present invention, in the textile machine disclosed in the aforementioned commonly assigned German Published Patent Application No. 3,932,665 and the cognate European Published Patent Application No. 419,833, published Apr. 3, 1991, and the disclosure of which, as previously stated, is incorporated herein in its entirety by reference. In that case, for example, the electro-acoustical transducer 18 of the aforementioned commonly assigned European Published Patent Application No. 419,833 could be replaced by the electro-acoustical transducers 160 and 160' of the present disclosure.

In principle, the electro-acoustical transducers provided with their self-checking or self-monitoring function as disclosed herein, can be beneficially employed at different types of textile machines which contain a travelling unit or elements moving at locations where there could be endangered objects, especially human beings if there were to occur a collision with the travelling unit or elements.

Turning attention now to FIGS. 39 and 40, there is depicted an arrangement comprising the respective light barriers 100 and 100.1, the related light beams of which are transmitted by the respective transmitters 101 and 101.1 and received by the respective receivers 102 and 102.1.

By means of the light barrier 100 there is illustrated that such is provided at a distance 105 from the cross-hatched danger zone or area of the width b which distance 105, for example, can amount to between 5 cm. and 40 cm., preferably about 10 cm.

This distance or spacing 105 ensures that, on the one hand, the bale opening member 130 does not extend into the region of the light barrier 100 and, on the other hand, should not be spaced at such a distance that a human being can enter the region between the light barrier 100 and the danger zone or area without being detected.

The light barriers 100 and 100.1 are spaced at the respective distances 107 and 107.1 from the center line 106 of the rail or track structure 120, and the distance or spacing 107 is essentially equal to the distance or spacing 107.1.

Through the employment of these measures there also exists the possibility of loading bales in a bale row at the opposite side of the bale opening machine 200, since the machine frame 110 usually can be rotated or swiveled through an angle of about 180°. Consequently, during the opening of a row of bales at one side of the bale opening machine 200 there can be set up a row of bales at the other side of such bale opening machine 200 and the preparatory work undertaken so that there can be ultimately opened that bale row.

Therefore, the light barrier 100.1 is only then turned on when at that side of the bale opening machine 200 there is opened the set up row of bales, this having been indicated by the use of the dashed line in conjunction with such light barrier 100.1. Switching over from the one light barrier to the other and vice versa can be easily accomplished by the control of the bale opening machine 200.

FIG. 40 depicts in elevation the arrangement of FIG. 39 and likewise shows with cross-hatching the danger zone or area of the length 1 and the height h which is fenced off or shielded by the light barrier 100. From such FIG. 40 there also will be apparent that this light barrier 100 is spaced at the distance or height 103 from the floor 104. This distance or height 103 can be chosen to be in the order of between about 20 cm. and 100 cm., preferably amounts to about 40 cm., and, in particular, such distance or height 103 should, in principle, be selected such that the light barrier 100 will be reliably interrupted whenever a human being approaches too closely the danger zone or area.

It is here further mentioned that it is within the teachings and concepts of the present invention to provide, instead of a single light barrier at each side of the bale opening machine 200, a plurality of light barriers for each machine side, and further, instead of providing a transmitter at one end and a receiver at the other end of the monitored zone or area, to provide the transmitter and receiver at the same end or location of the monitored zone or area and to use, instead of the depicted receivers 102 and 102.1, a suitable mirror or reflector.

Furthermore, the light beam equally can be constituted by a laser beam operating in a manner which is not dangerous to human beings.

Finally, it is expressly mentioned that those skilled in this technology will readily appreciate that one or more features of one embodiment can be readily employed in other embodiments to create still further embodiments.

While there are shown and described present preferred embodiments of the invention, it is distinctly to be understood the invention is not limited thereto, but may be otherwise variously embodied and practiced within the scope of the following claims.

What is claimed is:

1. A method of operating a textile machine having a material processing means extending from a movable support, comprising the steps of:
    processing a textile material with said processing means, said processing means having an exposed surface for contacting bales of fiber material and being movable in at least one direction;

monitoring an area in a vicinity of said material processing means; and said monitoring step further including a step of directing a sensing beam from at least any one of the movable support and the material processing means and directing a sensing beam from a side of said material processing means located opposite said movable support, said monitored area extending between said movable support, said exposed surface of said processing means and a profile of said textile material.

2. A method of operating a textile machine having a material processing means extending from a movable support, comprising the steps of:

processing a textile material with said processing means, said processing means having an exposed surface for contacting bales of fiber material and being movable in at least one direction;

monitoring an area in the vicinity of said material processing means; and said monitoring step further including a step of directing a sensing beam at least in the direction of movement of the movable support, for recognizing an object outside of the textile material, said sensing beam being movable with the movable support.

3. The method of operating a textile machine according to claim 2, further including the step of:

directing a sensing beam from a side of said material processing means located opposite said movable support.

4. The method of operating a textile machine according to claim 2, further including the step of:

using ultrasonic energy for producing the sensing beam directed at least in the direction of movement of the movable support.

5. A method of operating a textile machine having a material processing means extending from a movable support, comprising the steps of:

processing a textile material with said processing means, said processing means having an exposed surface for contacting bales of fiber material and being movable in at least one direction;

monitoring an area in the vicinity of said material processing means;

said monitoring step further including a step of directing a sensing beam at least in the direction of movement of the movable support; and providing protecting against entry of an object at a side of said material processing means located opposite said movable support.

6. A textile machine, comprising:

means for processing a textile material;

said processing means being movable in at least a first direction;

means for movably supporting said material processing means;

said supporting means being movable in a predetermined travel direction substantially perpendicular to said first direction;

said processing means extending from a side of said supporting means;

means for monitoring an area in a vicinity of said material processing means which extends from below said material processing means in a direction toward the textile material; and said monitoring means further including:

first sensing means for establishing a first detection path in the predetermined travel direction of the movable supporting means.

7. A textile machine, comprising:

means for processing a textile material;

said processing means being movable in at least a first direction;

means for movably supporting said material processing means;

said supporting means being movable in a direction substantially perpendicular to said first direction;

said processing means extending from a side of said supporting means;

means for monitoring an area in a vicinity of said material processing means which extends from below said material processing means in a direction toward the textile material;

said monitoring means further including:

a first sensing device for establishing a first detection path below said material processing means; and at least one protective device for protecting against unwanted entry of objects into the area being monitored from a side of said material processing means located opposite said supporting means.

8. The textile machine according to claim 7, wherein:

said at least one protective device includes a protective plate mounted to said material processing means.

9. An apparatus for opening bales of textile fibers, comprising:

a machine frame movable in a first direction;

an opening member extending from said machine frame;

said opening member having at least one rotatable roller for opening of the bales of textile fibers and being movably supported on said machine frame for movement in a second direction;

a surface of said opening member being exposed where said at least one rotatable roller contacts a fiber bale to be opened;

means for establishing an acoustic curtain about said exposed surface of said opening member;

said acoustic curtain establishing means further including:

at least one ultrasonic sensor mounted on said machine frame and at least one additional ultrasonic sensor mounted on said opening member;

each of said ultrasonic sensors providing a signal for deactivating operation of said opening member upon detecting penetration of an object into a portion of said acoustic curtain; and a profile of said fiber bale being used to determine a boundary of said acoustic curtain.

10. The apparatus according to claim 9, wherein:

an acoustic curtain is established on a first side of said opening member using two ultrasonic sensors having substantially parallel beam paths; and said acoustic curtain establishing means further includes a reflector mounted to said machine frame in a beam path of one of said two ultrasonic sensors to disperse said beam path in two directions.

11. A textile machine, comprising:

means for processing a textile material;

said processing means being movable in at least a first direction;

means for movably supporting said material processing means;

said supporting means being movable in a direction substantially perpendicular to said first direction;

said processing means extending from a side of said supporting means;

means for monitoring an area in a vicinity of said material processing means which extends from below said material processing means in a direction toward the textile material;

said monitoring means further including:
first sensing means for establishing a first detection path below said material processing means; and
at least one additional sensing means for establishing a second detection path from a side of said material processing means located opposite said supporting means.

12. The textile machine according to claim 11, wherein:
the first sensing means is located on said movable supporting means and establishes a first detection path from a portion of said movable supporting means located below said material processing means.

13. The textile machine according to claim 11, wherein:
said monitoring means comprises a plurality of ultrasonic detectors.

14. The textile machine according to claim 11, wherein:
said monitoring means includes an array of transmitters and receivers selectively mounted on at least any one of (i) said movable supporting means and (ii) said material processing means.

15. The textile machine according to claim 11, wherein:
said monitoring means includes an array of transmitters and receivers; and
at least some of said receivers being mounted separately from said textile machine in an area around the vicinity of the textile machine.

16. The textile machine according to claim 11, wherein:
said monitoring means includes a plurality of active sensors delivering outputs; and
means for continuously comparing the outputs of said active sensors with one another.

17. The textile machine according to claim 11, wherein:
said monitoring means includes a plurality of passive sensors delivering outputs; and
means for continuously comparing the outputs of said passive sensors with one another.

18. The textile machine according to claim 11, wherein:
said first sensing means includes at least one sensing device for establishing a detection path in the lateral direction of movement of said processing means in said first direction and at least one sensing device for establishing a detection path in said direction movement of said supporting means which is substantially perpendicular to said first direction.

19. The textile machine according to claim 11, wherein:
the first sensing means comprises at least one electro-acoustical transducer;
the at least one electro-acoustical transducer transmitting an acoustical signal;

means for receiving an acoustical signal reflected by an object located in the area to be monitored;
means for splitting the transmitted acoustical signal into an acoustical measuring signal which is directed towards the area to be monitored and an acoustical reference signal;
a reference reflector towards which there is directed the acoustical reference signal;
the reference reflector being located at a predeterminable spacing from the electro-acoustical transducer; and
the reference reflector being located above the electro-acoustical transducer.

20. The textile machine according to claim 19, wherein:
the means which receives the acoustical signal reflected by an object located in the area to be monitored comprises the at least one electro-acoustical transducer.

21. The textile machine according to claim 11, wherein:
said first sensing means includes at least one sensing device for establishing a detection path in a lateral direction of movement of said processing means in said first direction.

22. The textile machine according to claim 21, wherein:
said at least one sensing device for establishing a detection path in the lateral direction of movement of said processing means includes first and second sensor arrays;
each of said sensor arrays including a plurality of sensors having beam paths; and
the beam paths of sensors in said first sensor array being substantially perpendicular to the beam paths of sensors in said second sensor array.

23. The textile machine according to claim 22, wherein:
sensors of said first sensor array are mounted on said movable supporting means; and
said sensors of said second sensor array are mounted on said material processing means.

24. The textile machine according to claim 22, wherein:
sensors of each of said first sensor and second arrays are spaced less than 10 cm. apart from one another.

25. The textile machine according to claim 21, wherein:
said at least one sensing device for establishing a detection path in the lateral direction of movement of said processing means includes sensors mounted to said movable supporting means; and
each of said sensors having a beam path with a predetermined dispersion.

26. The textile machine according to claim 25, wherein:
at least one of said sensors mounted to said movable supporting means provides a beam path which intersects beam paths of remaining sensors.

27. The textile machine according to claim 21, wherein:
said at least one sensing device for establishing a detection path in the lateral direction of movement of said processing means includes at least two sensors mounted to said movable supporting means and which have substantially parallel beam paths; and a reflector for altering the beam path of one of said sensors.

28. The textile machine according to claim 21, wherein:
said at least one sensing device for establishing a detection path in the lateral direction of movement of said processing means includes at least two sensors mounted on said movable supporting means.

29. The textile machine according to claim 21, wherein:
said at least one sensing device for establishing a detection path in the lateral direction of movement of said processing means includes at least two sensors mounted on said material processing means.

30. A safety apparatus for a traveling unit of a textile machine, comprising:
monitoring means which monitor at least a part of a danger zone such that an object located in the danger zone stops the traveling unit of the textile machine;
the monitoring means comprising at least one electro-acoustical transducer;
the at least one electro-acoustical transducer transmitting an acoustical signal;
means for receiving an acoustical signal reflected by an object located in the danger zone;
means for splitting the transmitted acoustical signal into an acoustical measuring signal which is directed towards the danger zone to be monitored and an acoustical reference signal;
a reference reflector towards which there is directed the acoustical reference signal;
the reference reflector being located at a predeterminable spacing from the electro-acoustical transducer; and
the reference reflector being located above the electro-acoustical transducer.

31. The safety apparatus for a traveling unit of a textile machine according to claim 30, wherein:
the means which receives the acoustical signal reflected by an object located in the danger zone comprises the at least one electro-acoustical transducer.

32. The safety apparatus for a traveling unit of a textile machine according to claim 30, further including:
sonic chute means having oppositely situated end regions and an opening for passage therethrough of at least part of a beam emitted by the electro-acoustical transducer defining the acoustical measuring signal;
the electro-acoustical transducer and the reference reflector being operatively associated with the sonic chute means;
the electro-acoustical transducer being located at the vicinity of one of the oppositely situated end regions of the sonic chute means;
the reference reflector being located at the vicinity of the other one of the oppositely situated end regions of the sonic chute means;
deflection means located intermediate the oppositely situated end regions of the sonic chute means; and
the deflection means passing part of the beam emitted by the electro-acoustical transducer through the opening of the sonic chute means.

33. The safety apparatus for a traveling unit of a textile machine according to claim 32, further including:
an additional reflector arranged externally of the sonic chute means for fanning apart the beam emitted by the electro-acoustical transducer and defining a bundled beam.

34. The safety apparatus for a traveling unit of a textile machine according to claim 30, further including:
sonic chute means having oppositely situated ends and an opening for passage therethrough of at least part of a beam emitted by the electro-acoustical transducer defining the acoustical measuring signal;
the electro-acoustical transducer and the reference reflector being operatively associated with the sonic chute means;
the opening being located at the vicinity of one of the oppositely situated ends of the sonic chute means;
a pair of deflection means;
said pair of deflection means and said electro-acoustical transducer being located intermediate the oppositely situated ends of the sonic chute means;
one of the deflection means passing part of the beam emitted by the electro-acoustical transducer through the opening of the sonic chute means; and
the other one of the deflection means passing at least part of the beam emitted by the electro-acoustical transducer defining the acoustical signal through the opening of the sonic chute means and returning at least part of the acoustical signal reflected by the object back to the electro-acoustical transducer.

35. The safety apparatus for a traveling unit of a textile machine according to claim 34, further including:
an additional reflector arranged externally of the sonic chute means for fanning apart the beam emitted by the electro-acoustical transducer and defining a bundled beam.

36. The safety apparatus for a traveling unit of a textile machine according to claim 30, further including:
control means provided for the at least one electro-acoustical transducer.

37. The safety apparatus for a traveling unit of a textile machine according to claim 30, wherein:
the electro-acoustical transducer comprises an ultrasonic transducer.

38. The safety apparatus for a traveling unit of a textile machine according to claim 37, wherein:
the ultrasonic transducer comprises an ultrasonic transmitter and an ultrasonic receiver.

39. The safety apparatus for a traveling unit of a textile machine according to claim 30, further including:
means for changing the spacing between the electro-acoustical transducer and the reference reflector.

40. The safety apparatus for a traveling unit of a textile machine according to claim 39, wherein:
the means for changing the spacing between the electro-acoustical transducer and the reference reflector alters the position of the reference reflector.

41. The safety apparatus for a traveling unit of a textile machine according to claim 30, combination with:
a bale opening machine defining the textile machine;
the bale opening machine including a machine frame provided with a bale opening member defining the traveling unit;

rail means upon which reciprocatingly moves the bale opening machine;

the bale opening member being equipped with a bale opening roller arranged for up and down movement at the machine frame for extracting fiber flocks from bales arranged in a row during opening of the bales;

the monitoring means monitoring at least a part of a danger zone located around the bale opening roller such that an object located in the monitored danger zone stops the bale opening machine.

42. The safety apparatus for a traveling unit of a textile machine according to claim 41, wherein:

the bale opening member has an end located remote from the machine frame; and the electro-acoustical transducer being arranged at the end of the bale opening member located remote from the machine frame.

43. The safety apparatus for a traveling unit of a textile machine according to claim 41, further including:

sonic chute means having oppositely situated end regions and an opening for passage therethrough of at least part of a beam emitted by the electro-acoustical transducer defining the acoustical measuring signal;

the electro-acoustical transducer and the reference reflector being operatively associated with the sonic chute means;

deflection means located intermediate the oppositely situated end regions of the sonic chute means;

the sonic chute means being arranged such that the deflection means passes part of the beam emitted by the electro-acoustical transducer through the opening of the sonic chute means and receiving therethrough at least part of the acoustic signal reflected by an object located in the danger zone; and the part of the beam emitted by the electro-acoustical transducer through the opening of the sonic chute means and the at least part of the acoustic signal reflected by an object located in the danger zone and received by the deflection means extending substantially parallel to the row of bales.

44. The safety apparatus for a traveling unit of a textile machine according to claim 41, wherein:

the bale opening roller has an axis of rotation;

sonic chute means having oppositely situated end regions and an opening for passage therethrough of at least part of a beam emitted by the electro-acoustical transducer defining the acoustical measuring signal;

the electro-acoustical transducer and the reference reflector being operatively associated with the sonic chute means;

deflection means located intermediate the oppositely situated end regions of the sonic chute means;

the sonic chute means being arranged such that the deflection means passes part of the beam emitted by the electro-acoustical transducer through the opening of the sonic chute means and receiving therethrough at least part of the acoustic signal reflected by an object located in the danger zone; and the part of the beam emitted by the electro-acoustical transducer through the opening of the sonic chute means and the at least part of the acoustic signal reflected by an object located in the danger zone and received by the deflection means extending substantially parallel to the axis of rotation of the bale opening member.

45. The safety apparatus for a traveling unit of a textile machine according to claim 41, wherein:

the bale opening member has a front;

an additional reflector arranged externally of the sonic chute means for fanning apart the beam emitted by the electro-acoustical transducer and defining a bundled beam; and the sonic chute means and the additional reflector being arranged at the front of the bale opening member.

46. The safety apparatus or a traveling unit of a textile machine according to claim 41, wherein:

the bale opening member has a side;

an additional reflector arranged externally of the sonic chute means for fanning apart the beam emitted by the electro-acoustical transducer and defining a bundled beam; and the sonic chute means and the additional reflector being arranged at the side of the bale opening member.

47. The safety apparatus for a traveling unit of a textile machine according to claim 41, wherein:

an additional reflector arranged externally of the sonic chute means for fanning apart the beam emitted by the electro-acoustical transducer and defining a bundled beam; and the sonic chute means and the additional reflector being arranged at the machine frame.

48. The safety apparatus for a traveling unit of a textile machine according to claim 41, wherein:

the bale opening machine is movable in at least two different directions;

a respective at least one electro-acoustical transducer provided for each direction of movement of the bale opening machine; and electronic control means for activating only the at least one electro-acoustical transducer provided for that direction of movement through which momentarily travels the bale opening machine, 49. The safety apparatus for a traveling unit of a textile machine according to claim 41, further including:

drive means for driving the bale opening machine;

electronic control means for controlling operation of the drive means such that upon occurrence of a predetermined recognition signal there is selectively accomplished an interruption or movement reversal of the bale opening machine.

50. The safety apparatus for a traveling unit of a textile machine according to claim 41, wherein:

the monitoring means further includes light barrier means extending substantially parallel to the direction of reciprocatory movement of the bale opening machine; and said light barrier means providing a light barrier extending at least throughout the entire path of reciprocatory movement of the bale opening machine corresponding at least to a maximum number of bales to be opened by the bale opening machine and bounding the danger zone.

51. The safety apparatus for a traveling unit of a textile machine according to claim 50, wherein:

the bale opening machine moves along a floor; and the light barrier means having a spacing from the floor in a range of between 20 cm. and 100 cm.

* * * * *